United States Patent [19]
Oyama

[11] Patent Number: 6,070,680
[45] Date of Patent: Jun. 6, 2000

[54] CONTROL SYSTEM FOR A HYBRID VEHICLE FOR IMPROVING REGENERATIVE BRAKING EFFICIENCY WHILE AVOIDING ENGINE STALLS DURING REGENERATIVE BRAKING

[75] Inventor: Kazuo Oyama, Wako, Japan

[73] Assignee: Honda Giken Kogyo Kabushiki Kaisha, Tokyo, Japan

[21] Appl. No.: 08/869,807

[22] Filed: Jun. 5, 1997

[30] Foreign Application Priority Data

Jun. 12, 1996 [JP] Japan .................................. 8-171599

[51] Int. Cl.$^7$ ..................................................... B60K 1/00
[52] U.S. Cl. ........................... 180/65.2; 180/65.3; 701/22
[58] Field of Search ................................. 180/65.1, 65.2, 180/65.8, 65.3; 701/68, 69, 22

[56] References Cited

U.S. PATENT DOCUMENTS

| | | | |
|---|---|---|---|
| 5,754,969 | 5/1998 | Ando | 701/67 |
| 5,771,478 | 6/1998 | Tsukamoto | 701/68 |
| 5,934,396 | 8/1999 | Kurita | 180/65.2 |
| 5,942,879 | 8/1999 | Ibaraki | 322/16 |

FOREIGN PATENT DOCUMENTS

| | | |
|---|---|---|
| 0326188 | 8/1989 | European Pat. Off. . |
| 0710787 A2 | 5/1996 | European Pat. Off. . |
| 5-229351 | 9/1993 | Japan . |

*Primary Examiner*—Lanna Mai
*Assistant Examiner*—Andrew J. Ririe
*Attorney, Agent, or Firm*—Frishauf, Holtz, Goodman, Langer & Chick, P.C.

[57] ABSTRACT

A control system for a hybrid vehicle including a traction motor with a regenerative braking function. In order to increase the efficiency of regeneration, engine brake during regenerative braking is reduced by lowering the rotational speed of the engine below the lowest rotational speed value of the conventional control system. The control system can avoid engine stall during sudden, rapid deceleration which may occur during regenerative braking. Rapid deceleration of the vehicle is detected based on operating conditions of the vehicle. The traction motor has an assisting function where the traction motor drives the engine to help prevent a stall. The assisting function is carried out by controlling torque output from the traction motor to a predetermined positive value upon detection of the quick deceleration of the vehicle. The predetermined positive value is preset according to the operating characteristics of the vehicle's clutch.

5 Claims, 17 Drawing Sheets

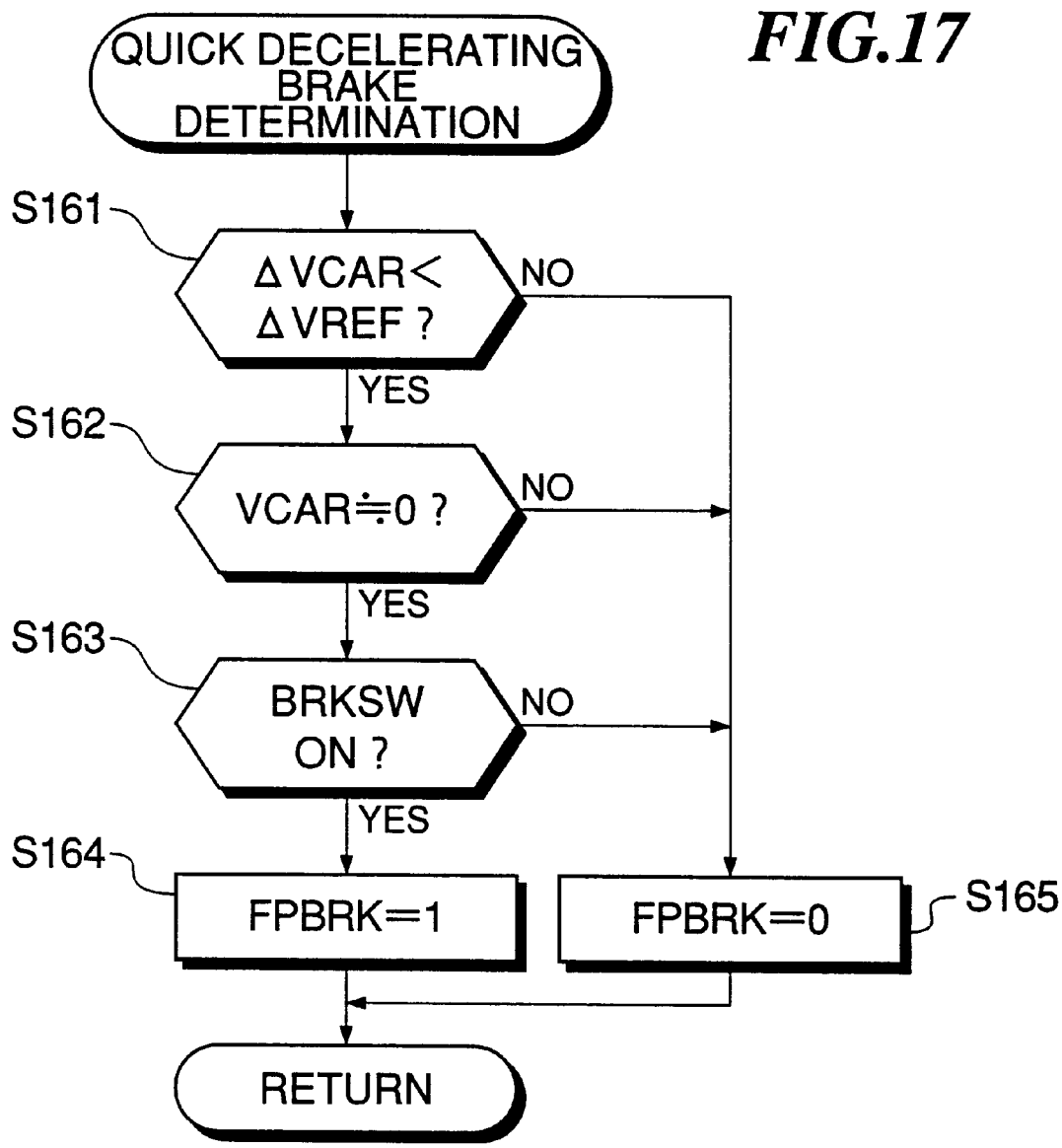

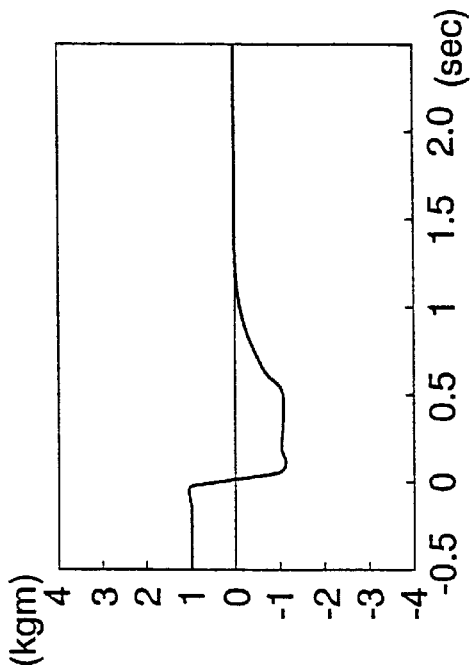
FIG.19A2 (PRIOR ART)
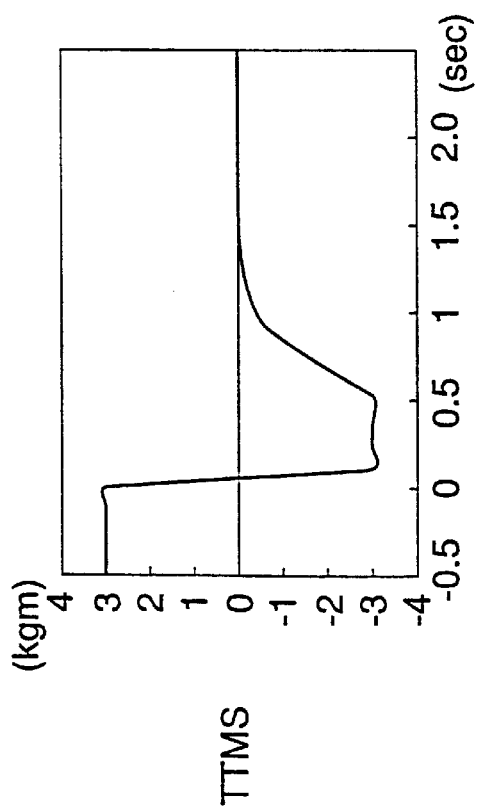
FIG.19B2 (PRIOR ART)
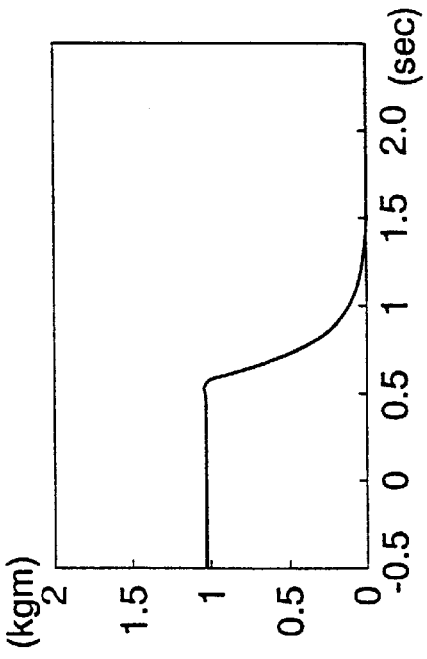
FIG.19A1
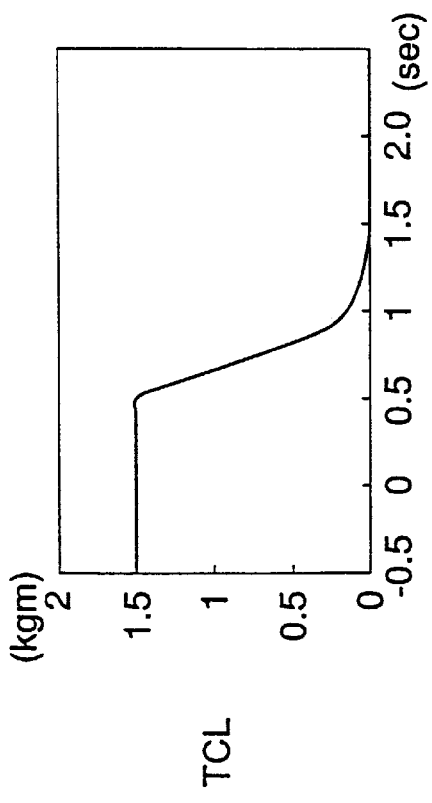
FIG.19B1

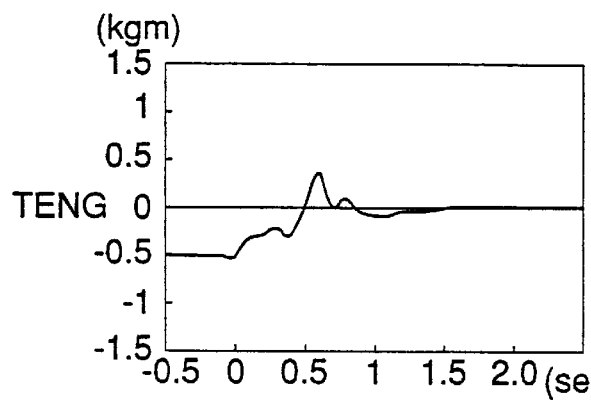
FIG.20A1
FIG.20A2 (PRIOR ART)
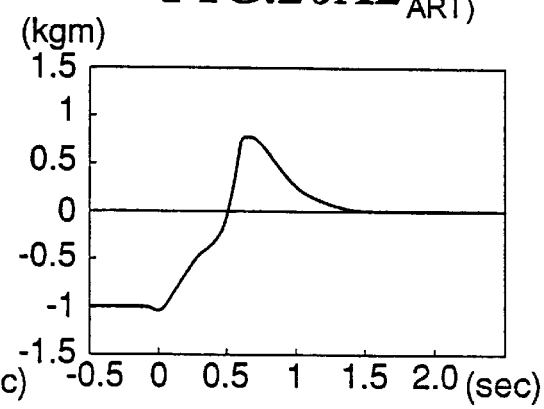
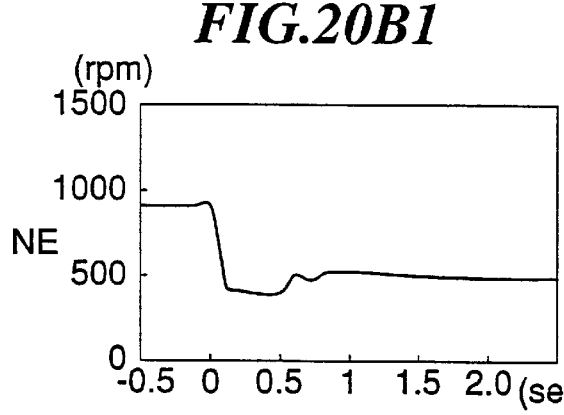
FIG.20B1
FIG.20B2 (PRIOR ART)
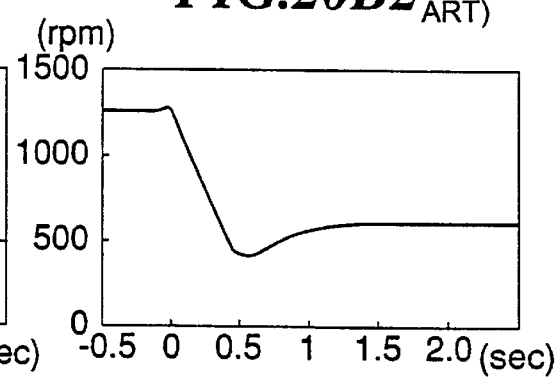
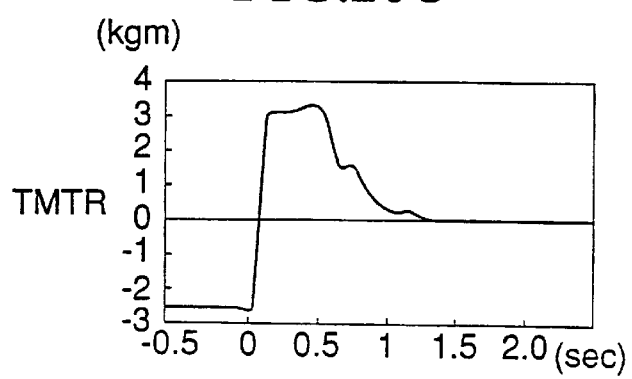
FIG.20C

CONTROL SYSTEM FOR A HYBRID VEHICLE FOR IMPROVING REGENERATIVE BRAKING EFFICIENCY WHILE AVOIDING ENGINE STALLS DURING REGENERATIVE BRAKING

BACKGROUND OF THE INVENTION

1. Field of the Invention

This invention relates to a control system for hybrid vehicles having an internal combustion engine and a traction motor as prime movers.

2. Prior Art

Conventionally, a hybrid vehicle having an internal combustion engine (hereinafter simply referred to as "the engine") and a traction motor as prime movers is widely known, and a control system for controlling the prime movers of such a hybrid vehicle has already been proposed, e.g. by Japanese Laid-Open Patent Publication (Kokai) No. 5-229351.

The proposed control system determines the optimum torque at which the maximum engine efficiency is attained, in dependence on traveling conditions of the vehicle, and at the same time detects actual torque generated by the engine for actually driving the vehicle. Then, the control system determines or selects demanded or required torque from the optimum torque and the actual torque. When the optimum torque is selected as the demanded torque, and at the same time the optimum torque is larger than the actual torque, regenerative current is caused to be generated for regeneration of energy (specifically, electrical energy).

When the regeneration of energy is carried out by the traction motor, generally, the amount of regenerative energy becomes larger with an increase in the rotational speed of the traction motor. On the other hand, as the rotational speed of the engine increases, the loss of energy due to engine braking increases. In many cases, therefore, it is desirable that the regeneration of energy is performed by lowering the rotational speed of the engine to a lowest possible value during deceleration of the vehicle, to achieve improved efficiency of regeneration. If the engine rotational speed is lowered to an excessively low value, however, the engine can stall especially at quick deceleration of the vehicle (when the driver quickly and strongly steps on a brake pedal of the vehicle).

The conventional control system, however, does not contemplate the influence of engine braking and engine stalling in controlling the traction motor at quick deceleration of the vehicle. Therefore, there still remains room for improvement in terms of efficient collection of kinetic energy of the vehicle at deceleration as electrical energy.

SUMMARY OF THE INVENTION

It is an object of the invention to provide a control system for a hybrid vehicle having an internal combustion engine and a traction motor, which is capable of properly controlling regeneration of electrical energy and driving of the vehicle by the traction motor at deceleration of the vehicle, to thereby improve the efficiency of regeneration by the traction motor.

To attain the above object, the present invention provides a control system for a hybrid vehicle including driving wheels, an internal combustion engine, a drive shaft driven by the engine, a traction motor having an assisting function of driving the drive shaft by electrical energy and a regenerative function of converting kinetic energy of the drive shaft into electrical energy, a transmission arranged between the driving wheels of the vehicle and the engine and the traction motor, a clutch arranged between the driving wheels of the vehicle and the engine and the traction motor, and electrical storage means for supplying electrical energy to the traction motor and for storing electrical energy output from the traction motor, the control system comprising:

vehicle quick deceleration-detecting means for detecting quick deceleration of the vehicle based on operating conditions of the vehicle and traction motor control means for carrying out the assisting function by controlling a motor output torque from the traction motor to a predetermined positive value upon detection of the quick deceleration of the vehicle by the vehicle quick deceleration-detecting means.

As a result, the lowest rotational speed value to which the engine rotational speed is lowered during deceleration of the vehicle is below the lowest rotational speed value of the conventional control system, and therefore the loss of energy due to engine braking can be reduced, to thereby improve the efficiency of the regeneration. Further, the time period over which the fuel supply is interrupted during the deceleration can be prolonged, to improve the fuel economy.

Preferably, the traction motor control means sets the predetermined positive value of the motor output torque from the traction motor based on a characteristic of control of an engaging force of the clutch carried out when the quick deceleration of the vehicle is detected.

More preferably, the traction motor control means sets the predetermined positive value to be constant until the engaging force of the clutch assumes a value smaller than a value for normal traveling of the vehicle.

Further preferably, the traction motor control means progressively decreases the predetermined positive value after the engaging force of the clutch assumes the value smaller than the value for normal traveling of the vehicle.

As a result, the vehicle can smoothly shift to an idling condition.

Preferably, the vehicle quick deceleration-detecting means includes vehicle speed-detecting means for detecting traveling speed of the vehicle, and vehicle speed change amount-calculating means for calculating an amount of change in the traveling speed of the vehicle, the vehicle quick deceleration-detecting means detecting the quick deceleration based on the detected traveling speed and the detected amount of change in the traveling speed.

More preferably, the vehicle quick deceleration-detecting means determines that the vehicle has been quickly decelerated only when (i) the traveling speed detected by the vehicle speed-detecting means is almost equal to 0 and (ii) the amount of change in the traveling speed detected by the vehicle speed change amount-detecting means is larger than a predetermined value.

Still more preferably, the vehicle includes a brake pedal, and the vehicle quick deceleration-detecting means including stepping-on operation-detecting means for detecting a stepping-on operation of the brake pedal, and the vehicle quick deceleration-detecting means determines that the vehicle has been quickly decelerated only when (i) the traveling speed detected by the vehicle speed-detecting means is almost equal to 0, (ii) the amount of change in the traveling speed detected by the vehicle speed change amount-detecting means is larger than a predetermined value, and (iii) the stepping-on operation of the brake pedal is detected by the stepping-on operation-detecting means.

The above and other objects, features, and advantages of the invention will become more apparent from the following detailed description taken in conjunction with the accompanying drawings.

BRIEF DESCRIPTION OF THE DRAWINGS

FIG. 17 is a flowchart showing a subroutine for carrying out a quick deceleration braking-determining process, which is executed at a step S147 in FIG. 16;

FIG. 19A1 is a graph showing a change in clutch torque TCL with the lapse of time, according to the present invention;

FIG. 19A2 is a similar graph to FIG. 19A1, according to the prior art;

FIG. 19B1 is a graph showing a change in torque TTMS of an input shaft of a transmission appearing in FIG. 1 with the lapse of time, according to the present invention;

FIG. 19B2 is a similar graph to FIG. 19B1, according to the prior art;

FIG. 20A1 is a graph showing a change in engine output torque TENG with the lapse of time, according to the present invention;

FIG. 20A2 is a similar graph to FIG. 20A1, according to the prior art;

FIG. 20B1 is a graph showing a change in the engine rotational speed NE with the lapse of time, according to the present invention;

FIG. 20B2 is a similar graph to FIG. 20B1, according to the prior art; and

FIG. 20C is a graph showing a change in output torque TMRT of a traction motor appearing in FIG. 1, according to the present invention.

DETAILED DESCRIPTION

The invention will now be described in detail with reference to the drawings showing an embodiment thereof.

Figure 1:
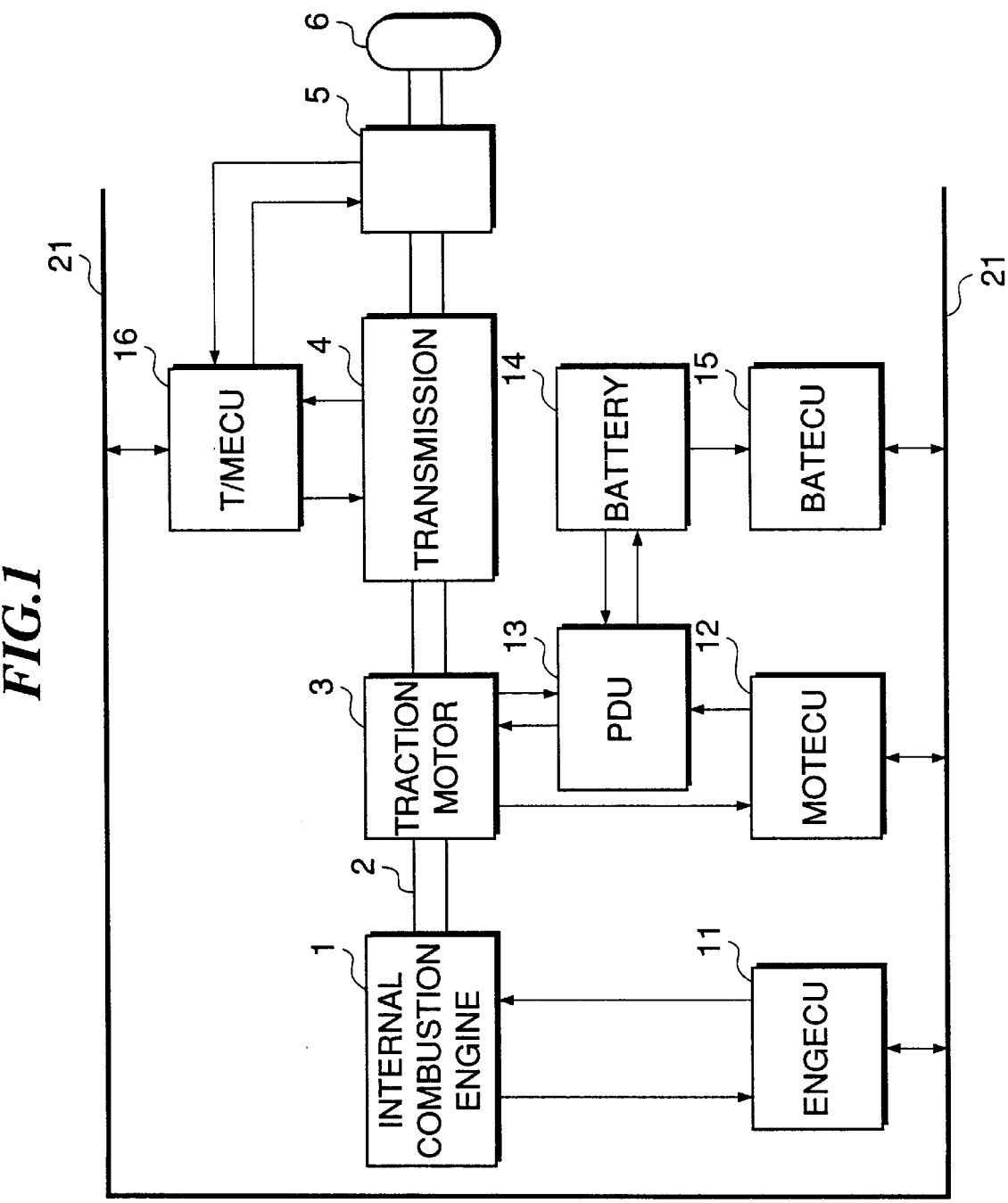
FIG. 1 is a block diagram schematically showing the whole arrangement of a drive system of a hybrid vehicle, and a control system therefor, according to an embodiment of the invention.

Referring first to FIG. 1, there is schematically shown the arrangement of a drive system for a hybrid vehicle, and a control system therefor (sensors, actuators, and other components associated therewith are omitted), according to an embodiment of the invention.

As shown in the figure, an internal combustion engine (hereinafter simply referred to as "the engine") 1 rotatively drives a drive shaft 2 to transmit torque via a transmission 4 and a clutch 5 to driving wheels 6 to rotatively drive the same. A traction motor 3 is arranged on the drive shaft 2 such that the former can directly drive the latter for rotation. The traction motor 3 serves not only as a prime mover for assisting the engine 1 but also as a generator for performing a regenerative function of converting part of vehicle's kinetic energy transmitted from the rotating drive shaft 2 into electrical energy, and outputting the electrical energy to recharge a storage battery 14 electrically connected thereto via a power drive unit (hereinafter referred to as "the PDU") 13. The traction motor 3 has its operation controlled by a control signal received via the PDU 13.

The control system includes an electronic control unit (hereinafter referred to as "ENGECU") 11 for controlling the engine 1, an electronic control unit (hereinafter referred to as "MOTECU") 12 for controlling the traction motor 3, an electronic control unit (hereinafter referred to as "BATECU") 15 for controlling the storage battery 14, and an electronic control unit (hereinafter referred to as "T/MECU") 16 for controlling the transmission 4. These ECU's are connected to each other via a data bus 21, and transmit data of detected parameters, information on flags, etc. to each other.

Figure 2:
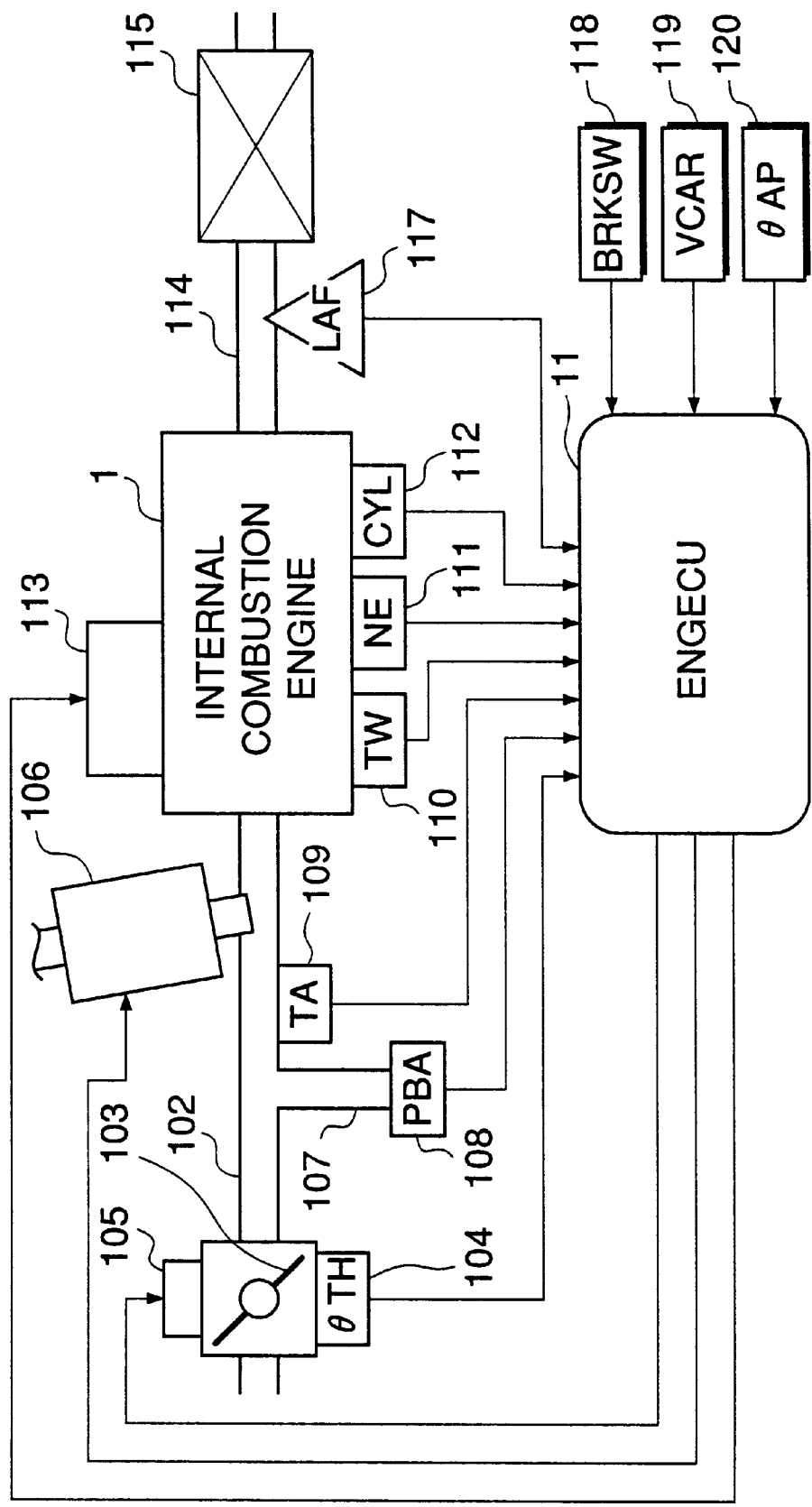
FIG. 2 is a block diagram schematically showing the arrangement of an internal combustion engine and a control system therefor.

FIG. 2 shows the arrangement of the engine 1, the ENGECU 11, and peripheral devices associated therewith. Connected to the cylinder block of the engine is an intake pipe 102 in which is arranged a throttle valve 103. A throttle valve opening (θTH) sensor 104 is connected to the throttle valve 103, for generating an electric signal indicative of the sensed throttle valve opening θTH and supplying the same to the ENGECU 11. The throttle valve 103 is a so-called drive-by-wire type (DBW) and connected to a throttle actuator 105 to have the valve opening θTH thereof electrically controlled thereby. The throttle actuator 105 has its operation controlled by a signal from the ENGECU 11.

Fuel injection valves 106, only one of which is shown, are inserted into the intake pipe 102 at locations intermediate between the cylinder block of the engine 1 and the throttle valve 103 and slightly upstream of respective corresponding intake valves, not shown. The fuel injection valves 106 are connected to a fuel pump via a pressure regulator, neither of which is shown, and electrically connected to the ENGECU 11 to have their valve opening periods and valve opening timing controlled by signals therefrom.

On the other hand, an intake pipe absolute pressure (PBA) sensor 108 is provided in communication with the interior of the intake pipe 102 via a conduit 107 at a location immediately downstream of the throttle valve 103, for supplying an electric signal indicative of the sensed absolute pressure PBA within the intake pipe 102 to the ENGECU 11.

An intake air temperature (TA) sensor 109 is inserted into the intake pipe 102 at a location downstream of the conduit 107, for supplying an electric signal indicative of the sensed intake air temperature TA to the ENGECU 11. An engine coolant temperature (TW) sensor 110, which may be formed of a thermistor or the like, is mounted in the cylinder block of the engine 1, for supplying an electric signal indicative of the sensed engine coolant temperature TW to the ENGECU 11.

An engine rotational speed (NE) sensor 111 is arranged in facing relation to a camshaft or a crankshaft of the engine 1, neither of which is shown. The engine rotational speed (NE) sensor 111 generates a pulse (hereinafter referred to as "the TDC signal pulse") at a predetermined crank angle position of each cylinder whenever the crankshaft rotates through 180 degrees. The TDC signal pulse is supplied to the ENGECU 11.

The engine 1 has spark plugs 113 respectively provided for the cylinders and each connected to the ENGECU 11 to have its ignition timing controlled by a signal therefrom.

A three-way catalyst 115 is arranged within an exhaust pipe 114 connected to the cylinder block of the engine 1, for purifying noxious components such as HC, CO, and NOx. A linear output type air-fuel ratio sensor (hereinafter referred to as "the LAF sensor") 117 is arranged in the exhaust pipe 114 at a location upstream of the three-way catalyst 115. The LAF sensor 117 supplies an electric signal which is substantially proportional to the concentration of oxygen present in exhaust gases to the ENGECU 11. The LAF sensor 117 is capable of detecting the air-fuel ratio of a mixture supplied to the engine 1 over a wide range from a leaner side to a richer side.

Electrically connected to the ENGECU 11 are a brake switch 118 which is turned on in response to a stepping-on operation of a brake pedal of the vehicle, not shown, a vehicle speed sensor 119 for detecting a vehicle speed VCAR at which the vehicle is traveling, and an accelerator opening sensor 120 for detecting an accelerator pedal position θAP exerted by the driver (hereinafter referred to as "accelerator opening"). Signals indicative of the sensed parameters are supplied to the ENGECU 11.

The ENGECU 11 is comprised of an input circuit, not shown, which has the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), not shown, a memory device, not shown, which stores various operational programs which are executed by the CPU, and results of calculations therefrom, etc., and an output circuit, not shown, which outputs driving signals to the fuel injection valves 106, the spark plugs 113, etc. The construction of each of the other ECU's is basically similar to that of the ENGECU 11.

Figure 3:
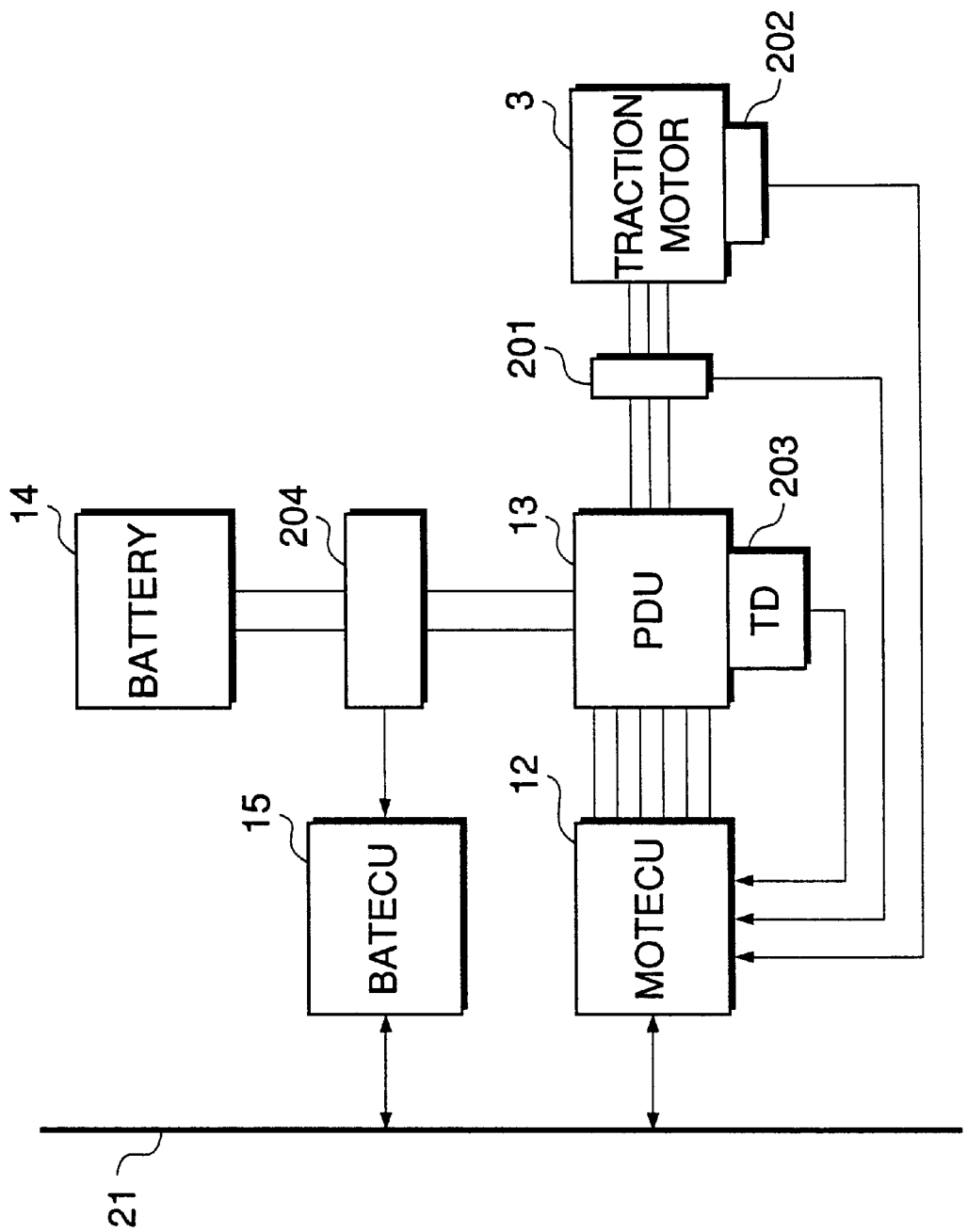
FIG. 3 is a block diagram schematically showing the arrangement of a traction motor and a control system therefor.

FIG. 3 shows details of the connection of the traction motor 3, the PDU 13, the storage battery 14, the MOTECU 12, and the BATECU 15.

The traction motor 3 has a motor rotational speed sensor 202 arranged thereon for detecting the rotational speed of the traction motor 3, of which an output signal indicative of the sensed motor rotational speed is supplied to the MOTECU 12. Arranged on lines electrically connecting between the PDU 13 and the traction motor 3 is a current/voltage sensor 201 for detecting voltage and electric current of electricity supplied to or generated from the traction motor 3. Further, the PDU 13 has a temperature sensor 203 arranged thereon for detecting the temperature TD of a protective resistance of a drive circuit, not shown, of the traction motor 3. These sensors 201, 203 supply signals indicative of the respective detected parameters to the MOTECU 12.

Arranged on lines electrically connecting between the storage battery 14 and the PDU 13 is a voltage/current sensor 204 for detecting voltage across output terminals of the storage battery 14 and electric current flowing from or into the storage battery 14, of which output signals indicative of the sensed voltage and the sensed electric current are supplied to the BATECU 15.

Figure 4:
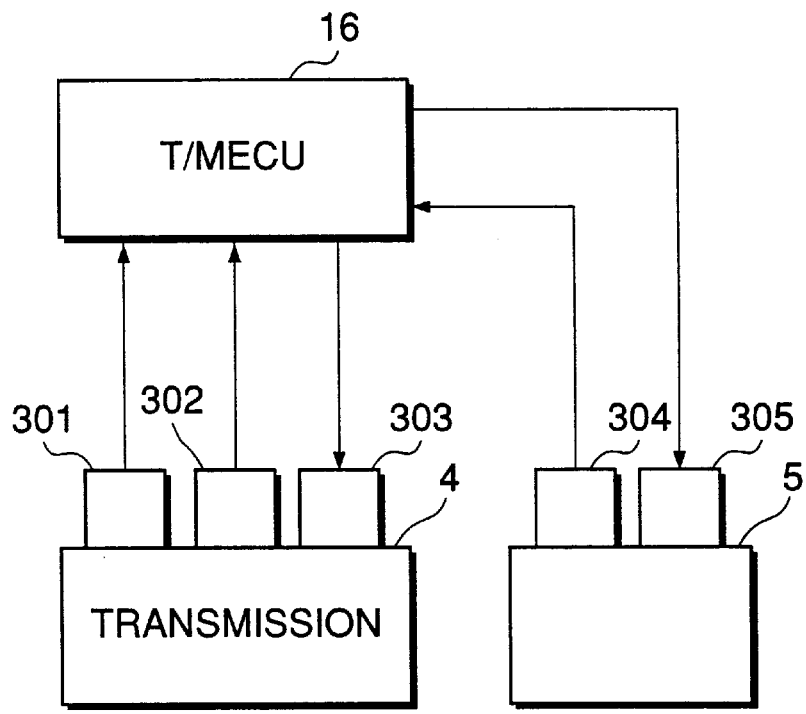
FIG. 4 is a block diagram schematically showing the arrangement of a transmission and a control system therefor.

FIG. 4 shows details of the connection of the transmission 4, the clutch 5, and the T/MECU 16. The transmission 4 is a variable speed transmission, and has rotational speed sensors 301 and 302 arranged thereon for detecting the rotational speed ND of a driving shaft of the transmission 4 and the rotational speed NM of a driven shaft of the same, respectively, of which signals indicative of the sensed parameters are supplied to the T/MECU 16. The T/MECU 16 calculates a change gear ratio GR, based on the output signals from the sensors 301 and 302. Further, the transmission 4 is provided with a transmission actuator 303 for controlling the change gear ratio GR of the transmission 4, which has its operation controlled by a signal from the T/MECU 16.

The clutch 5 has a rotational speed sensor 304 arranged thereon for detecting the rotational speed NMCL of an output shaft (driven side) of the clutch 5, of which a signal indicative of the sensed rotational speed is supplied to the T/MECU 16. The T/MECU 16 calculates a clutch speed ratio RCL (=NM/NMCL) from the driven shaft rotational speed NM and the clutch output shaft rotational speed NMCL. Further, the clutch 5 is provided with a clutch actuator 305 for controlling the engaging force of the clutch 5, which has its operation controlled by a signal from the T/MECU 16.

Figure 5:
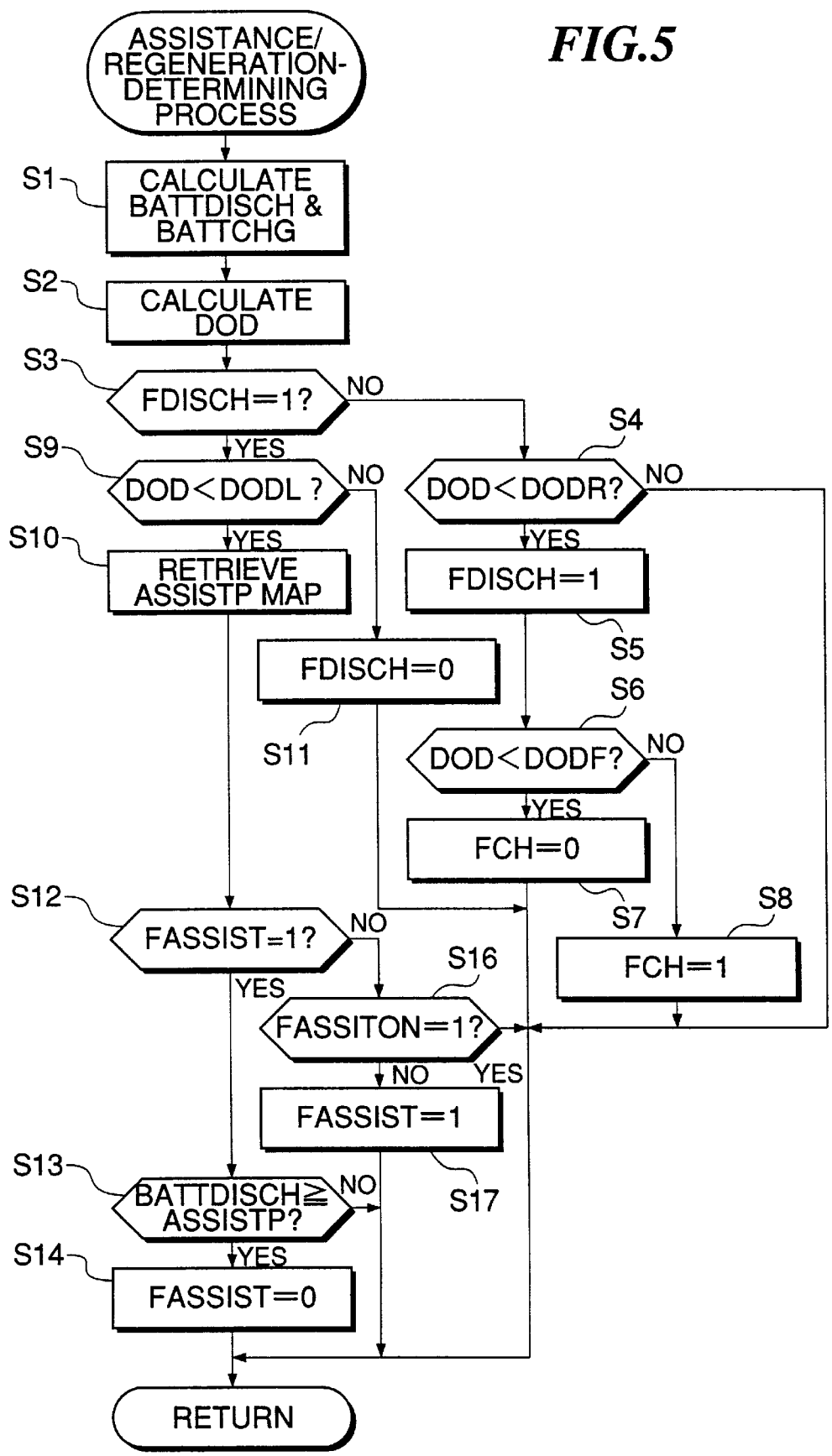
FIG. 5 is a flowchart showing a program for carrying out an assistance/regeneration-determining process in which whether the assistance of the traction motor to the engine or the regeneration of electrical energy by the traction motor should be carried out is determined based on the amount of remaining charge in a storage battery.

FIG. 5 shows a program for carrying out an assistance/regeneration-determining process, which is executed by the BATECU 15, e.g. at predetermined time intervals.

First, at a step S1, a cumulative discharge value BATTDISCH and a cumulative charge value BATTCHG of the storage battery 14 are calculated. More specifically, output current from the storage battery 14 and input current (charging current) flowing into the same are detected by the current/voltage sensor 204, and a cumulative value of the former (BATTDISCH) and a cumulative value of the latter (BATTCHG) are calculated whenever the present process is carried out. In the present embodiment, the cumulative discharge value BATTDISCH assumes a positive value while the cumulative charge value BATTCHG assumes a negative value. Further, the cumulative discharge value BATTDISCH is reset when the assistance of the traction motor 3 to the engine 1 is started (at a step S49 in FIG. 11), while the cumulative charge value BATTCHG is reset when the regeneration of electrical energy by the traction motor 3 is started (at a step S73 in FIG. 12).

At the following step S2, a depth of discharge DOD of the storage battery 14 is calculated. More specifically, provided that BATTFULL represents the capacity of the storage battery 14, i.e. an amount of electric charge which the storage battery 14 can discharge when it is in its fully-charged state, the depth of discharge DOD can be calculated by the use of the following equation (1):

$$DOD = (BATTDISCH + BATTCHG)/BATTFULL \qquad (1)$$

Accordingly, a remaining charge BATTREM in the storage battery 14 can be calculated by an equation of BATTREM=BATTFULL−(BATTDISCH+BATTCHG), and a remaining charge ratio RREM by an equation of RREM=BATTREM/BATTFULL=1−DOD.

At a step S3, it is determined whether or not a discharge-permitting flag FDISCH, which, when set to "1", indicates that discharging of the storage battery 14 is permitted, assumes "1". If FDISCH=1 holds, it is determined at a step S9 whether or not the depth of discharge DOD is smaller than a predetermined reference value DODL which corresponds to a lower limit of the amount of electric charge stored in the storage battery 14. If DOD≧DODL holds, which means that the remaining charge BATTREM in the storage battery 14 is small, the discharge-permitting flag FDISCH is set to "0" at a step S11 to thereby inhibit discharging of the storage battery 14, followed by terminating the program.

Figure 6:
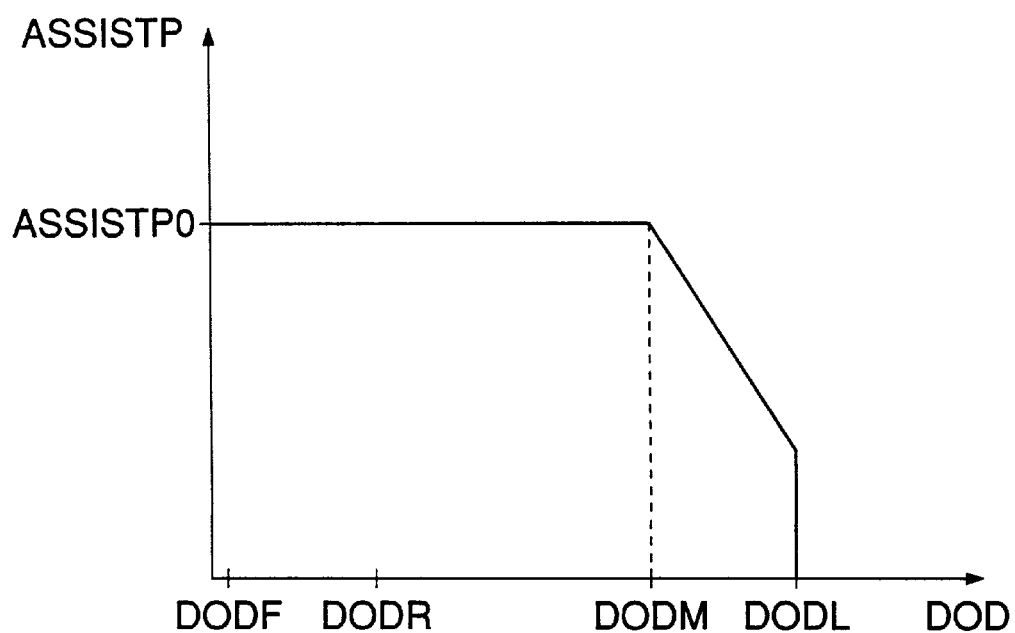
FIG. 6 shows an ASSISTP map for use in the FIG. 5 process.

If DOD<DODL holds at the step S9, an ASSISTP map is retrieved according to the depth of discharge DOD at a step S10 to determine an allowable amount of discharge ASSISTP. The ASSISTP map is set, e.g. as shown in FIG. 6, such that until the depth of discharge DOD reaches a predetermined reference value DODM corresponding to a medium amount of charge in the storage battery 14, the allowable amount of discharge ASSISTP is set to a predetermined fixed value ASSISTP0, and when the depth of discharge DOD is within a range from the predetermined reference value DODM to the predetermined reference value DODL, the ASSISTP value is set to a smaller value as the depth of discharge DOD increases.

At the following step S12, it is determined whether or not an assistance-permitting flag FASSIST, which, when set to "1", indicates that the traction motor 3 is permitted to assist the engine 1 in providing torque to the driving wheels 6, assumes "1". If FASSIST=1 holds, it is determined at a step S13 whether or not the cumulative discharge value BATTDISCH is equal to or larger than the allowable amount of discharge ASSISTP. If BATTDISCH<ASSISTP holds, the program is immediately terminated, i.e. the assistance of the traction motor 3 to the engine 1 continues to be permitted, whereas if BATTDISCH≧ASSISTP holds, the assistance-permitting flag FASSIST is set to "0" at a step S14 to thereby inhibit the assistance of the traction motor 3, followed by terminating the program.

The steps S13 and S14 make it possible to prevent the storage battery 14 from being excessively discharged, since the assistance of the traction motor 3 is inhibited when the cumulative discharge value BATTDISCH is equal to or larger than the allowable amount of discharge ASSISTP.

On the other hand, if FASSIST=0 holds at the step S12, which means that the assistance of the traction motor 3 is not permitted, it is determined at a step S16 whether or not an assistance-executing flag FASSISTON, which, when set to

1, indicates that the assistance of the traction motor 1 is being executed, assumes "1". If FASSISTON=1 holds, the program is immediately terminated, whereas if FASSISTON=0 holds, the assistance-permitting flag FASSIST is set to "1" at a step S17, followed by terminating the program.

If FDISCH=0 holds at the step S3, which means that discharging of the storage battery 14 is not permitted, it is determined at a step S4 whether or not the depth of discharge DOD is smaller than a predetermined reference value DODR at or below which a dischargeable state of the storage battery 14 is permitted to be restored (see FIG. 6). If DOD≧DODR holds, the program is immediately terminated to continue inhibition of discharging of the storage battery 14, whereas if DOD<DODR holds by virtue of regeneration, the discharge-permitting flag FDISCH is set to "1" at a step S5, and further it is determined at a step S6 whether or not the depth of discharge DOD is smaller than a predetermined reference value DODF indicative of a substantially fully-charged state of the storage battery 14 (see FIG. 6). If DOD≧DODF holds, which means that the storage battery 14 is not fully charged, a charge-permitting flag FCH is set to "1" at a step S8, thereby permitting charging or recharging of the storage battery 14. On the other hand, if DOD<DODF holds, which means that the storage battery 14 is substantially fully charged, the charge-permitting flag FCH is set to "0" at a step S7, thereby inhibiting charging of the storage battery 14, followed by terminating the program.

Figure 7:
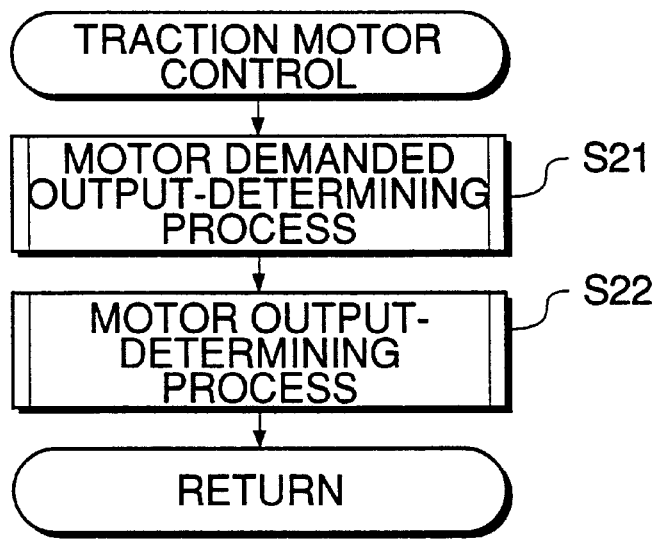
FIG. 7 is a flowchart showing a program for carrying out overall traction motor control.

FIG. 7 shows a program for carrying out a traction motor control process, which is executed by the MOTECU 12 at predetermined time intervals. This program comprises two steps: a step S21 for executing a motor demanded output-determining process (subroutine shown in FIG. 8), and a step S22 for executing a motor output-determining process (subroutine shown in FIGS. 11 and 12).

Figure 8:
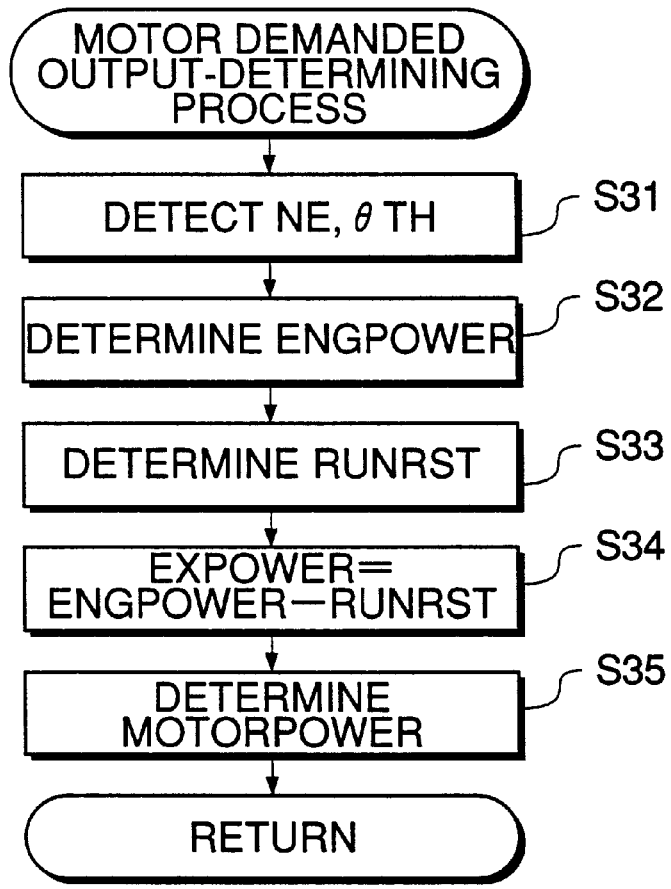
FIG. 8 is a flowchart showing a subroutine for carrying out a motor demanded output-determining process.

Referring to the FIG. 8 subroutine for the motor demanded output-determining process, first, at a step S31, the engine rotational speed NE and the throttle valve opening θTH (or alternatively the accelerator opening θAP) are detected. Then, an ENGPOWER map is retrieved according to detected values of these parameters to determine an engine demanded output ENGPOWER, i.e. an engine output demanded by the driver of the vehicle, at a step S32.

Figure 9:
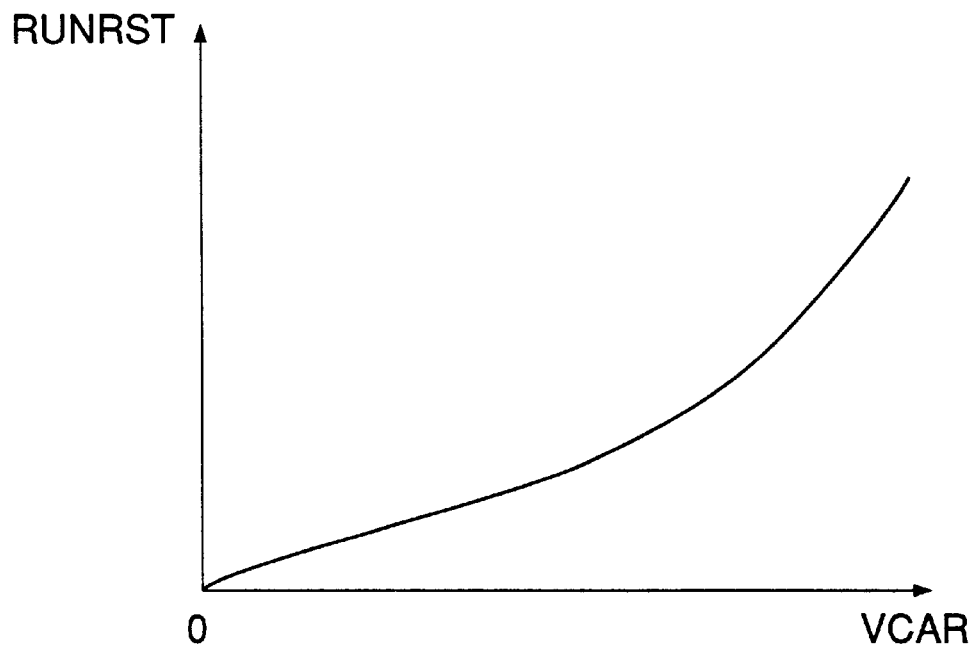
FIG. 9 shows a RUNRST table for determining running resistance RUNRST of the vehicle.

At the following step S33, a RUNRST table is retrieved according to the vehicle speed VCAR to determine a running resistance RUNRST of the vehicle, i.e. a resistance which the vehicle receives when it travels. The RUNRST table is set, e.g. as shown in FIG. 9, such that as the vehicle speed VCAR increases, the running resistance RUNRST assumes a higher value. Then, at a step S34, an extra output EXPOWER is calculated by subtracting the running resistance RUNRST from the engine demanded output ENGPOWER. In the above determinations and calculation, the engine demanded output ENGPOWER and the running resistance RUNRST are both measured in watts (W).

Figure 10:
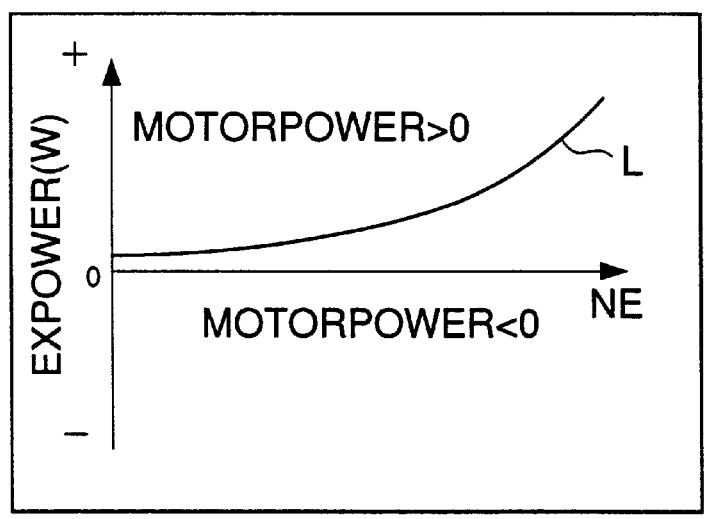
FIG. 10 shows a MOTORPOWER map for determining motor demanded output MORTORPOWER.

At the following step S35, a MOTORPOWER map is retrieved according to the engine rotational speed NE, and the extra output EXPOWER to determine a motor demanded output MOTORPOWER. In an area above a curve L in the map, as viewed in FIG. 10, i.e. in an operating region in which the extra output EXPOWER is large, the motor demanded output MOTORPOWER is set to a positive value (MOTORPOWER>0), thereby permitting the assistance of the traction motor 3. On the other hand, in an area below the curve L as viewed in FIG. 10, i.e. in an operating region in which the extra output EXPOWER assumes a small positive value or a negative value, the motor demanded output MOTORPOWER is set to a negative value (MOTORPOWER<0), thereby permitting regeneration of electrical energy by the traction motor 3. As shown in FIG. 10, the curve L progressively rises with an increase in the engine rotational speed NE, which means that as the engine rotational speed NE is higher, the motor demanded output MOTORPOWER is set to a positive value relative to a larger value of the extra output EXPOWER, i.e. the assistance of the traction motor 3 is permitted.

As described above, according to the FIG. 8 process, the extra output EXPOWER of the engine is calculated by subtracting the running resistance RUNRST from the engine demanded output ENGPOWER, and the motor demanded output MOTORPOWER is determined according to the extra output EXPOWER and the engine rotational speed NE.

Figure 11:
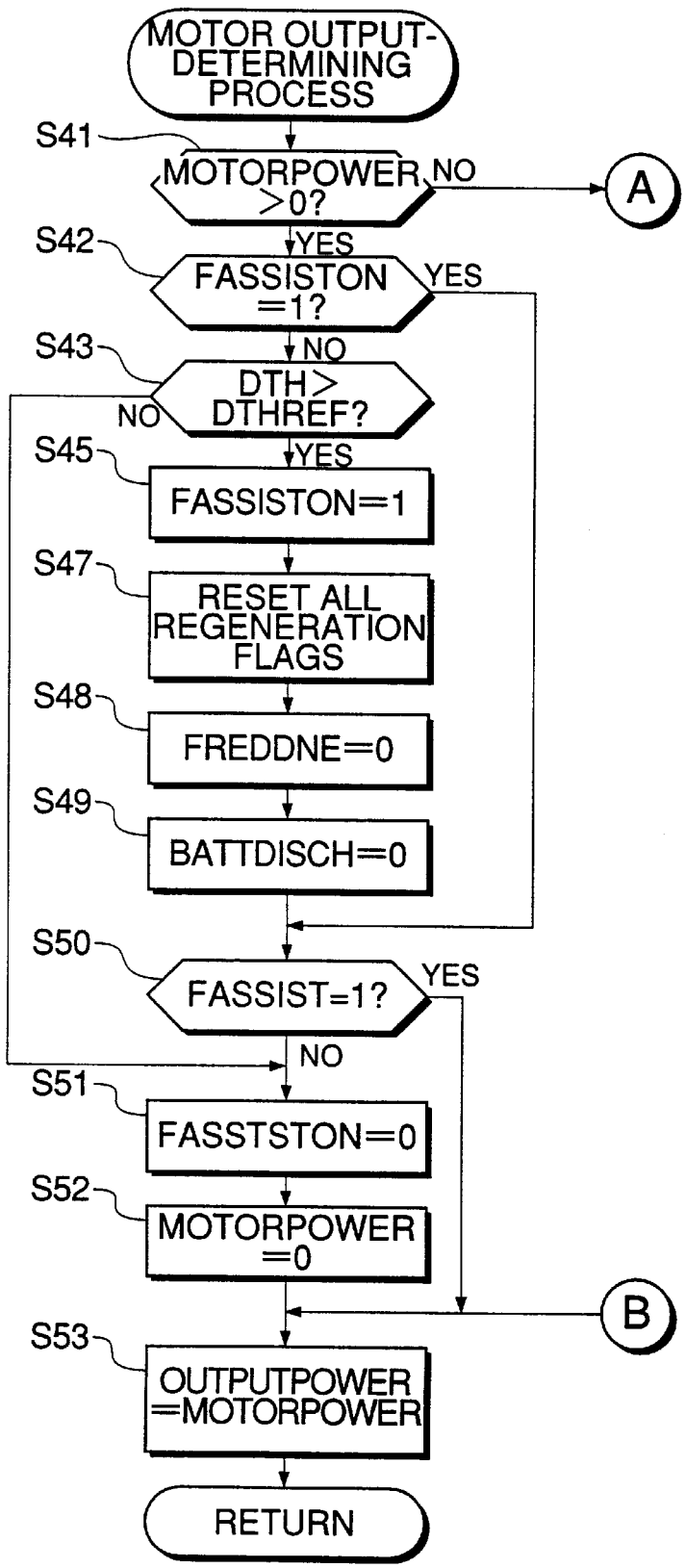
FIG. 11 is a flowchart showing a subroutine for carrying out a motor output-determining process.
Figure 12:
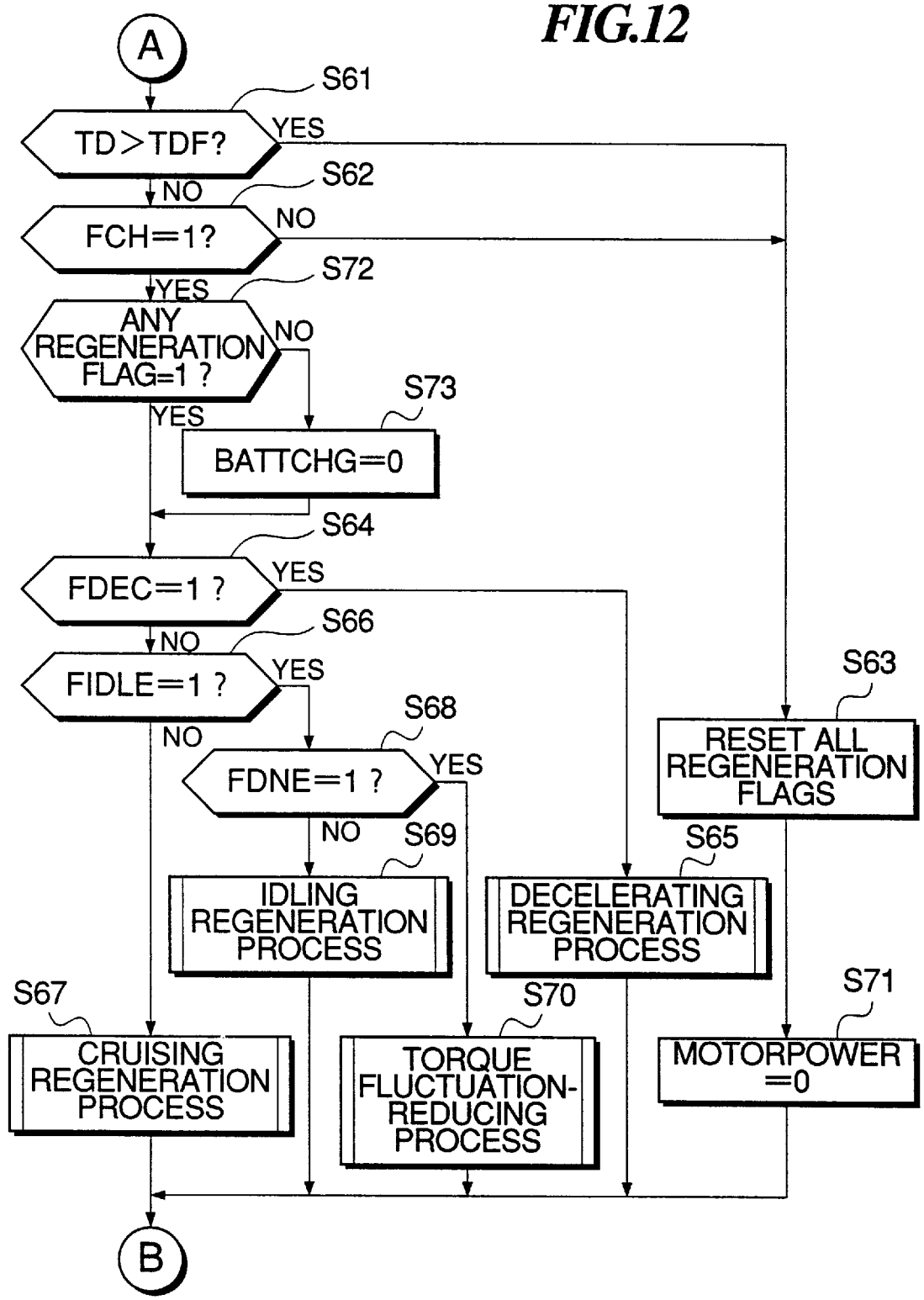
FIG. 12 is a continued part of the FIG. 11 flowchart.

FIGS. 11 and 12 show the subroutine for carrying out the motor output-determining process which is executed at the step S22 in FIG. 7.

First, at a step S41, it is determined whether or not the motor demanded output MOTORPOWER is larger than "0". If MOTORPOWER>0 holds, it is determined at a step S42 whether or not the assistance-executing flag FASSISTON assumes "1". If FASSISTON=1 holds, which means that the assistance of the traction motor 3 to the engine 1 is being executed, the program jumps to a step S50, whereas if FASSISTON=0 holds, which means that the assistance of the traction motor 3 is not being executed, it is determined at a step S43 whether or not an amount of change DTH in the throttle valve opening θTH detected is larger than a predetermined value DTHREF (>0).

If DTH≦DTHREF holds, the program jumps to a step S51, whereas if DTH>DTHREF holds, which means that acceleration of the engine 1 is being demanded, the assistance-executing flag FASSISTON is set to "1" at a step S45, and then the program proceeds to a step S47.

At the step S47, all kinds of regeneration flags (which are set to "1" when the regeneration of electrical energy by the traction motor 3 is executed), i.e. a cruising regeneration flag FCRUREG, an idling regeneration flag FIDLEREG, and a decelerating regeneration flag FDREG, are set to "0". Then, a fluctuation-reducing flag FREDDNE, which, when set to "1", indicates that a torque fluctuation-reducing process (step S70 in FIG. 12) is being executed, is set to "0" at a step S48, and the cumulative discharge value BATTDISCH is reset to "0" at the step S49, followed by the program proceeding to the step S50.

At the step S50, it is determined whether or not the assistance-permitting flag FASSIST assumes "1". If FASSIST=1 holds, the program jumps to a step S53, whereas if FASSIST=0 holds, the program proceeds to the step S51.

At the step S51, the assistance-executing flag FASSISTON is set to "0", and the motor demanded output MOTORPOWER is set to "0" at a step S52. Then, the program proceeds to the step S53, wherein the motor output OUTPUTPOWER is set to the motor demanded output MOTORPOWER, followed by terminating the program.

According to the above steps S42 to S52, so long as the motor demanded output MOTORPOWER>0 holds, the drive system of the hybrid vehicle is controlled in the following manner:

1) Even if MOTORPOWER>0 holds, the assistance of the traction motor 3 to the engine 1 is not executed unless the acceleration of the engine is demanded (steps S43, S51, and S52); and 2) When the acceleration of the engine is demanded, if leaning operation of the engine 1 and assistance of the traction motor 3 to the engine 1 are permitted, the drive system of the hybrid vehicle is operated with the assistance of the traction motor 3 to the engine 1 such that the air-fuel ratio of the mixture supplied to the engine 1 is controlled to a fixed lean value or a lean value dependent on the amount of assistance of the traction motor 3 to the engine 1, whereas if the leaning operation of the engine 1 and the assistance of the traction motor 3 to the engine 1 are not permitted, the drive system of the hybrid vehicle is operated with the assistance of the traction motor 3 to the engine 1 such that the air-fuel ratio of the mixture is controlled to a normal or stoichiometric value (steps S43, S45, and S50).

If MOTORPOWER≦0 holds at the step S41, the program proceeds to a step S61 in FIG. 12, wherein it is determined whether or not the temperature TD of the protective resistance of the PDU 13 is higher than a predetermined value TDF. If TD>TDF holds, there is a fear that the temperature of the drive circuit of the PDU 13 becomes too high to execute the regeneration of electrical energy by the traction motor 3, so that all the regeneration flags are set to "0" at a step S63 to thereby inhibit the regeneration, and further the motor demanded output MOTORPOWER is set to "0" at a step S71, followed by the program proceeding to the step S53 in FIG. 11. This makes it possible to prevent the temperature of the drive circuit of the PDU 13 from becoming excessively high.

On the other hand, if TD≦TDF holds at the step S61, it is determined at a step S62 whether or not the charge-permitting flag FCH assumes "1". If FCH=0 holds, which means that charging or recharging of the storage battery 14 is not permitted, the program proceeds to the step S63 to thereby inhibit the regeneration. This makes it possible to prevent excessive charging of the storage battery 14, heat loss of the PDU 13 due to the excessive charging of the storage battery 14, and other inconveniences.

If FCH=1 holds at the step S62, which means that the charging of the storage battery 14 is permitted, it is determined at a step S72 whether or not any of the regeneration flags FCRUREG, FIDLEREG, and FDREG assumes "1". If any of these flags assumes "1", the program skips to a step S64, whereas if all the regeneration flags assume "0", the cumulative charge value BATTCHG is set to "0" at the step S73, and then the program proceeds to the step S64.

At the step S64, it is determined whether or not a deceleration flag FDEC, which, when set to "1", indicates that deceleration of the engine 1 is being demanded (see steps S144 to S146 in FIG. 16), assumes "1". If FDEC=1 holds, a decelerating regeneration process is carried out at a step S65 (by executing a subroutine shown in FIG. 13), and then the program proceeds to the step S53.

If FDEC=0 holds, which means that deceleration of the engine 1 is not being demanded, it is determined at a step S66 whether or not an idling flag FIDLE, which, when set to "1", indicates that the engine 1 is idling (see steps S151 to S155 in FIG. 16), assumes "1". If FIDLE=0 holds, which means that the engine is not idling, a cruising regeneration process is carried out at a step S67, and then the program proceeds to the step S53.

In the cruising regeneration process, the cruising regeneration flag FCRUREG is set to "1", and then a cruising regeneration amount map, not shown, is retrieved according to the engine rotational speed NE and the extra output EXPOWER, to thereby determine a cruising regeneration amount CRUREG. Then, the motor demanded output MOTORPOWER is set to the thus determined cruising regeneration amount CRUREG.

If FIDLE=1 holds at the step S66, it is determined at a step S68 whether or not a rotation fluctuation flag FDNE, which, when set to "1", indicates that the rotational speed of the engine 1 largely fluctuates, assumes "1". If FDNE=1 holds, the torque fluctuation-reducing process is carried out at the step S70, whereas if FDNE=0 holds, an idling regeneration process is carried out at a step S69, and then the program proceeds to the step S53.

In the torque fluctuation-reducing process, the value of the motor demanded output MOTORPOWER is determined so as to reduce the fluctuations in the engine rotational speed. In the idling regeneration process, the idling regeneration flag FIDLEREG is set to "1", and an idling regeneration amount IDLEREG is determined according to the depth of discharge DOD of the storage battery 14. Then, the motor demanded output MOTORPOWER is set to the thus determined idling regeneration amount IDLEREG.

As described above, according to the motor output-determining process of FIGS. 11 and 12, the traction motor 3 is selectively set to one of an assisting mode in which the traction motor 3 assists the engine 1 (by the steps S45 to S50, and S53), a regenerative mode in which the regeneration of electrical energy is executed (by the steps S65, S67, and S69), and a zero output mode in which the traction motor 3 generates no output (by the steps S52 and S71), based on the motor demanded output MOTORPOWER determined in the FIG. 8 process, and in dependence on the states of the assistance-permitting flag FASSIST and the charge-permitting flag FCH both set in dependence on the amount of remaining charge in the storage battery 14. This makes it possible to control the traction motor 3 such that it performs the assistance of the engine 1 and regeneration of electrical energy in a suitable manner, whereby the fuel economy and torque-generating performance of the drive system of the hybrid vehicle can be improved while preserving a sufficient amount of remaining charge in the storage battery 14.

Figure 13:
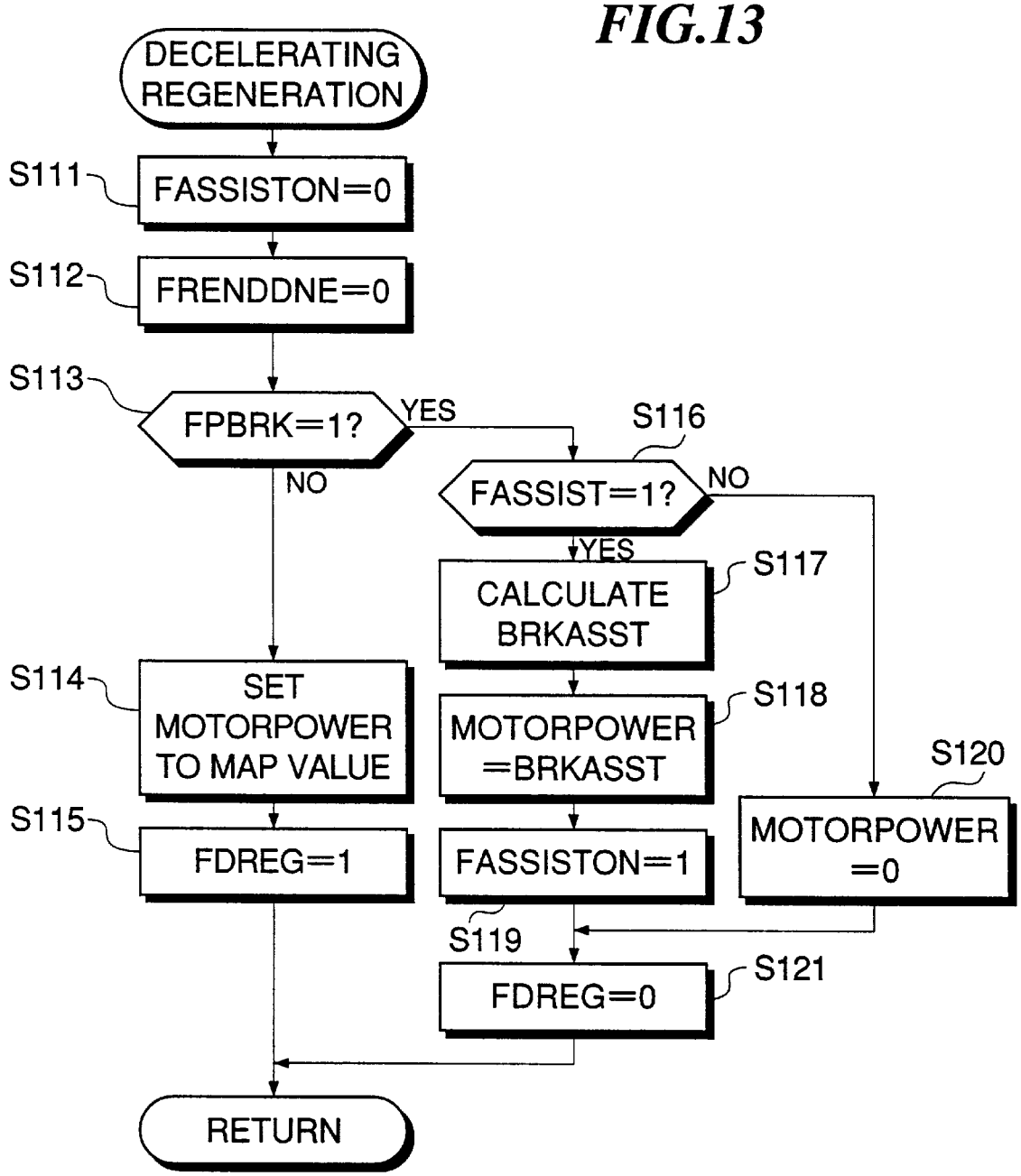
FIG. 13 is a flowchart showing a subroutine for carrying out a decelerating regeneration process, which is executed at a step S65 in FIG. 12.

FIG. 13 shows a subroutine for carrying out the decelerating regeneration process which is executed at the step S65 in FIG. 12.

First, the assistance-executing flag FASSISTON is set to "0" at a step S111, and the fluctuation-reducing flag FREDDNE is set to "0" at a step S112. Then, a quick deceleration flag FPBRK is set to "1" at a step S113. The quick deceleration flag FPBRK (see FIG. 17), when set to "1", indicates that quick deceleration of the vehicle, more specifically, a quick decelerating brake operation, i.e. an operation of quickly and strongly stepping on a brake pedal of the vehicle by the driver, has been detected.

If FPBRK=0 holds, which means that the quick decelerating brake operation has not been detected, the program proceeds to a step S114, wherein the motor demanded output MOTORPOWER is set to a map value determined at the step S35 in FIG. 8, by retrieving the MOTORPOWER map in the operating region in which EXPOWER<0 holds. Then, the decelerating regeneration flag FDREG is set to "1" at a step S115, followed by terminating the program.

On the other hand, if FPBRK=1 holds at the step S113, which means that the quick decelerating brake operation has been detected, it is determined at a step S116 whether or not the assistance-permitting flag FASSIST assumes "1". If FASSIST=0 holds, which means that assistance of the traction motor 3 is not permitted, the motor demanded output MOTORPOWER is set to zero at a step S120, and then the decelerating regeneration flag FDREG is set to "0" at a step S121, followed by terminating the present routine.

When the vehicle is quickly decelerated when FASSIST=0 holds, i.e. the assistance of the traction motor 3 is not permitted, the engine is likely to stall. Therefore, if FASSIST=0 holds when the vehicle is quickly decelerated, the T/MECU 16 selects a lower-gear ratio map as a gear-shifting map for determining the change gear ratio, whereby the transmission 4 is gear-shifted to a lower gear ratio to increase the engine rotational speed NE so as to prevent engine stalling.

Figure 14:
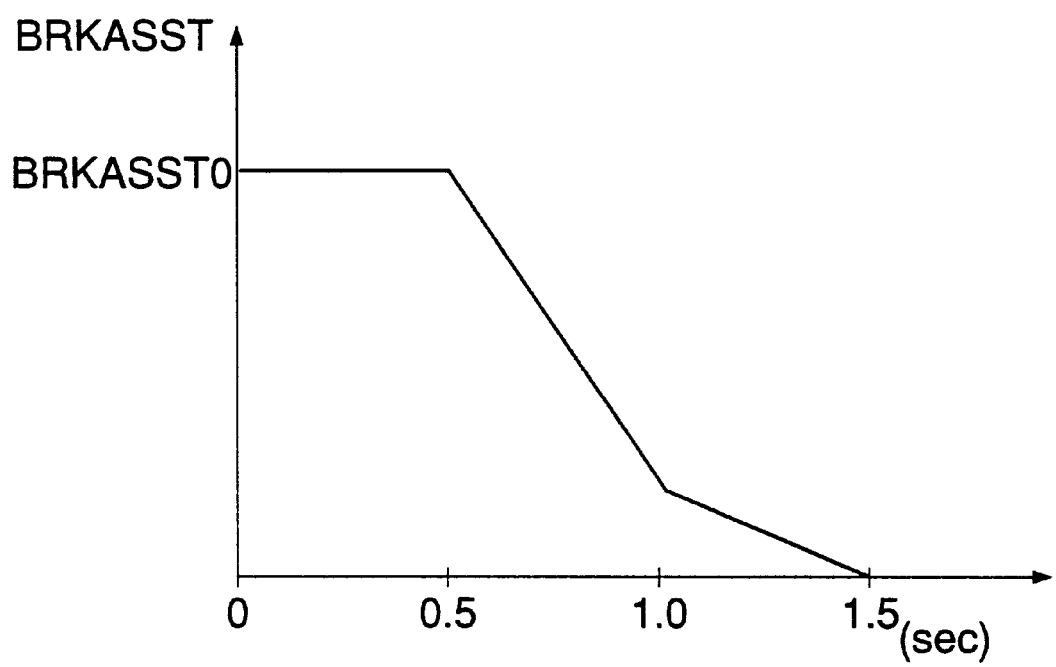
FIG. 14 shows a table for determining an assistance amount BRKASST, which is used in the FIG. 13 process.

If FASSIST=1 holds at the step S116, i.e. assistance of the traction motor 3 is permitted, a BRKASST table, shown in FIG. 14, is retrieved to determine an assistance amount BRKASST (a positive motor output value) for the quick decelerating brake operation at a step S117. The BRKASST table is set according to the time lapse from detection of the quick decelerating brake operation such that the BRKASST value assumes a predetermined positive value BRKASST0 (which is determined during the design phase of the vehicle and is built into the control system as a constant) over a first predetermined time period (which is set as a constant based on the characteristic of the vehicle's clutch) of, for example, 0.5 sec after the detection, and progressively decreases from the predetermined positive value BRKASST0 with the lapse of time after the lapse of 0.5 sec. The setting of the BRKASST table is based on the characteristic of control of the engaging force of the clutch 5 (see FIG. 19A1) carried out when the quick decelerating brake operation is detected. More specifically, while the engaging force of the clutch 5 assumes a value for normal traveling of the vehicle, i.e. a value corresponding to a clutch torque value of 1.5 kgm, the assistance amount BRKASST is set to the predetermined positive value BRKASST0, and thereafter it is decreased with a decrease in the engaging force of the clutch 5.

Thus, by executing assistance of the traction motor 3 to the engine 1 during the quick decelerating brake operation, engine stalling can be avoided. As a result, the lowest NE value to which the engine rotational speed NE is lowered during deceleration is below the lowest NE value of the conventional control system, and therefore the loss of energy due to engine braking can be reduced, to thereby improve the efficiency of the regeneration. Further, the time period over which the fuel supply is interrupted during the deceleration can be prolonged, to improve the fuel economy. These results achieved according to the present embodiment will be described in detail hereinafter with reference to FIGS. 18 to 20.

At the following step S118, the motor demanded output MOTORPOWER is set to the BRKASST value determined at the step S117, and the assistance execution flag FASSISTON is set to "1" at a step S119, followed by the program proceeding to the step S121.

In the above described manner, the MOTECU 12 controls the PDU13 in operation modes (assisting mode, regeneration mode, and zero-output mode), based on the motor output OUTPUTPOWER determined according to the process of FIGS. 11 and 12.

Figure 15:
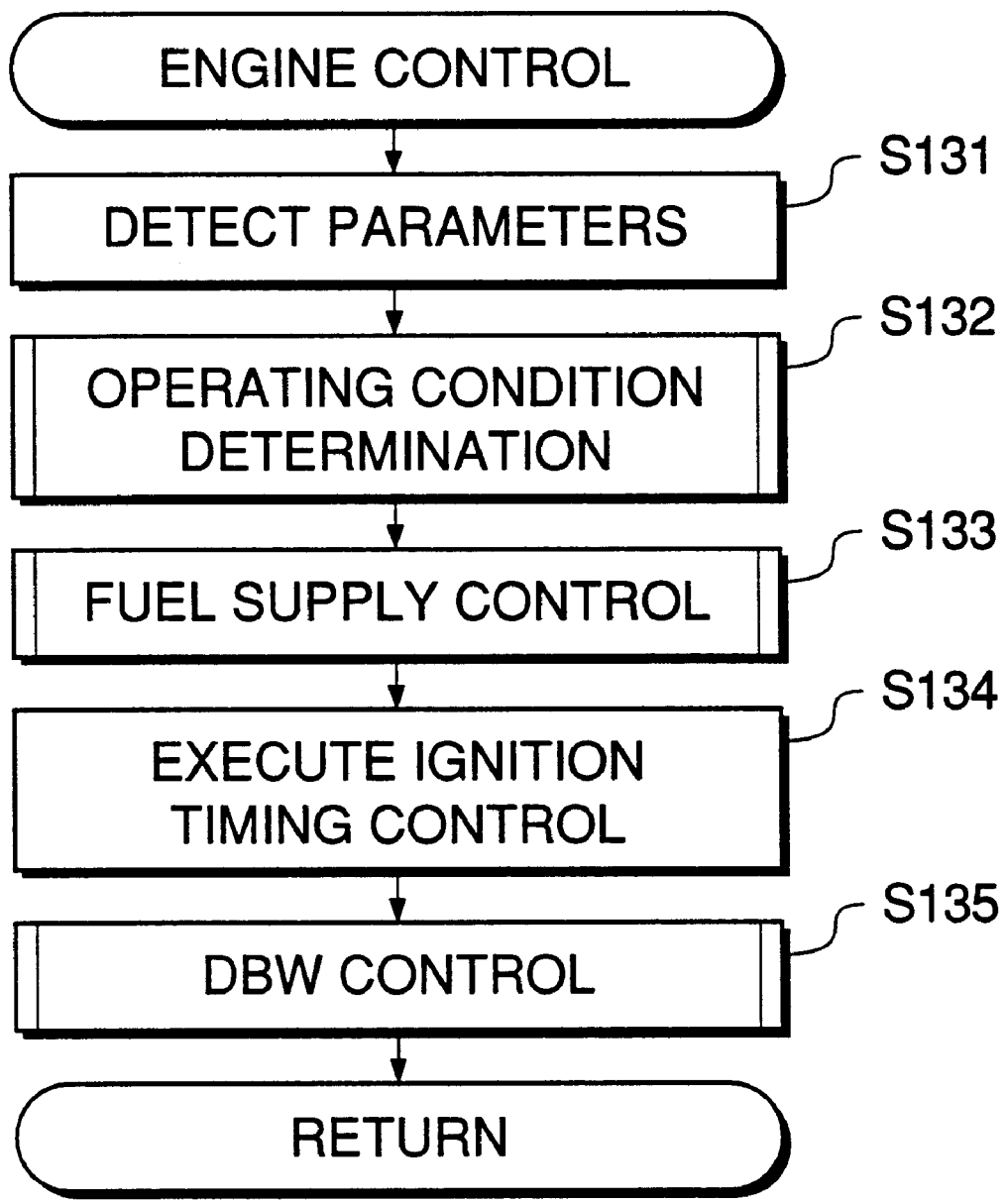
FIG. 15 is a flowchart showing a routine for carrying out an overall engine control process.

Next, description will be made of engine control executed by the ENGECU 11. FIG. 15 shows a program for carrying out overall engine control, which is executed, e.g. at predetermined time intervals.

First, various engine operating parameters, including the engine rotational speed NE and the intake pipe absolute pressure PBA, are detected at a step S131, and then an operating condition-determining process at a step S132, a fuel supply control process at a step S133, an ignition timing control process at a step S134, and a DBW control process (throttle valve opening control process via the throttle actuator 105) at a step S135 are sequentially executed.

Figure 16:
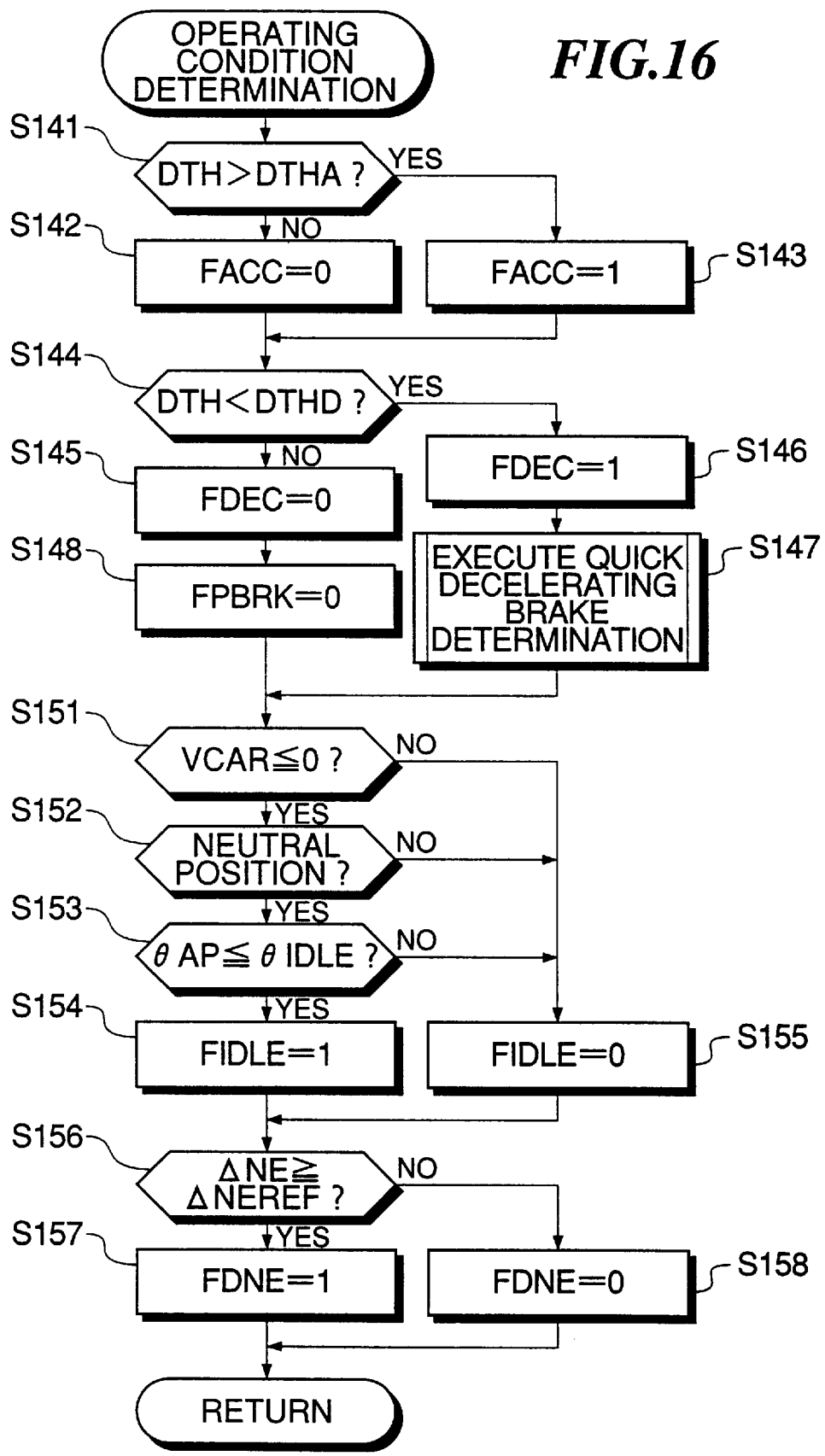
FIG. 16 is a flowchart showing a subroutine for carrying out an engine operating condition-determining process, which is executed at a step S132 in FIG. 15.

FIG. 16 shows a subroutine for carrying out the operating condition-determining process at the step S132 in FIG. 15.

At a step S141, it is determined whether or not the amount of change DTH in the detected throttle valve opening θTH (present θTH value−immediately preceding θTH value) is larger than a predetermined positive value DTHA. If DTH>DTHA holds, an acceleration flag FACC is set to "1" at a step S143, whereas if DTH≦DTHA holds, the acceleration flag is set to "0" at a step S142, and then the program proceeds to a step S144.

At the step S144, it is determined whether or not the amount of change DTH in the throttle valve opening θTH is smaller than a predetermined negative value DTHD. If DTH<DTHD holds, the deceleration flag FDEC is set to "1" at a step S146, and then a quick deceleration brake-determining process of FIG. 17 is executed at a step S147.

At a step S161 in FIG. 17, it is determined whether or not an amount of change ΔVCAR in the vehicle speed VCAR (present VCAR value−immediately preceding VCAR value) is smaller than a predetermined negative value ΔVREF. If ΔVCAR<ΔVREF holds, i.e. if the deceleration degree is large, it is determined at a step S162 whether or not the vehicle speed VCAR is almost equal to 0, more specifically, whether or not the vehicle speed VCAR is lower than a predetermined low value VCAR0. If VCAR≈0 holds, it is determined at a step S163 whether or not the brake switch 118 is on. If the answers to the questions of the steps S161 to S163 are all affirmative (YES), it is determined that the quick decelerating brake operation has taken place, and therefore the quick deceleration flag FPBRK is set to "1" at a step S164, followed by terminating the present routine. On the other hand, if any of the answers to the questions of the steps S161 to S163 is negative (NO), the quick deceleration flag FPBRK is set to "0" at a step S165, followed by terminating the present routine.

Alternatively, a step of determining whether or not an amount of change ΔN in the engine rotational speed NE is smaller than a predetermined value, i.e. whether or not the deceleration degree of the engine rotational speed NE is large, may be added to the process of FIG. 17, to thereby determine the quick deceleration brake operation.

Referring again to the FIG. 16 process, after execution of the step S147, the program proceeds to a step S151. On the other hand, if DTH≧DTHD holds at the step S144, the deceleration flag FDEC is set to "0" at a step S145, and then the quick deceleration flag FPBRK is set to "0" at a step S148, followed by the program proceeding to the step S151.

At the following step S151, it is determined whether or not the vehicle speed VCAR is equal to or lower than 0. If VCAR≦0 holds, which means that the vehicle is at a stop, it is determined at a step S152 whether or not the transmission 4 is in a neutral position. If the transmission 4 is in the neutral position, it is determined at a step S153 whether or not the accelerator opening θAP is equal to or smaller than a& predetermined idling value θIDLE. If all the answers to the questions of the steps S151 to S153 are affirmative (YES), it is judged that the engine is idling, so that the idling flag FIDLE is set to "1" at a step S154, whereas if any of the answers to the questions of the steps S151 to S153 is negative (NO), it is judged that engine is not idling, so that the idling flag FIDLE is set to "0" at a step S155, and then the program proceeds to a step S156.

At the step S156, it is determined whether or not the amount of change ΔNE in the engine rotational speed NE (ΔNE=present NE value−immediately preceding NE value) is equal to or larger than a predetermined value ΔNEREF. If ΔNE≧ΔNEREF holds, the rotation fluctuation flag FDNE is set to "1" at a step S157, whereas if ΔNE<ΔNEREF holds, the rotation fluctuation flag FDNE is set to "0" at a step S158, followed by terminating the program.

In the fuel supply control executed at the step S133 in FIG. 15, if the deceleration flag FDEC=1 holds, fuel supply to the engine is interrupted. On the other hand, if FDEC=0 holds, the valve opening period over which the fuel injection valve 106 is opened and the valve opening timing of the same are calculated according to operating parameters of the engine 1, including the engine rotational speed NE and the intake pipe absolute pressure PBA, and the fuel supply control is executed based on the calculated values. As described before, if the vehicle is decelerated so that the engine rotational speed NE approaches a predetermined idling rotational speed, the fuel supply is resumed.

In the ignition timing control executed at the step S134, the ignition timing of the engine 1 is calculated according to operating parameters of the engine 1, including the engine rotational speed NE and the intake pipe absolute pressure PBA, and the ignition timing control is executed based on the calculated values.

In the DBW control executed at the step S135, a desired value of the throttle valve opening θTH is calculated according to the accelerator opening θAP, the engine rotational speed NE, etc., and the throttle valve opening θTH is controlled to the calculated desired value. If the engine is in a transient state from deceleration of the vehicle to idling of the engine, the throttle valve 103 is controlled to slightly open, to thereby prevent engine stalling.

Next, description will made of the results achieved by carrying out the assistance of the traction motor 3 to the engine 1 in response to detection of the quick deceleration brake operation.

Figure 18A:
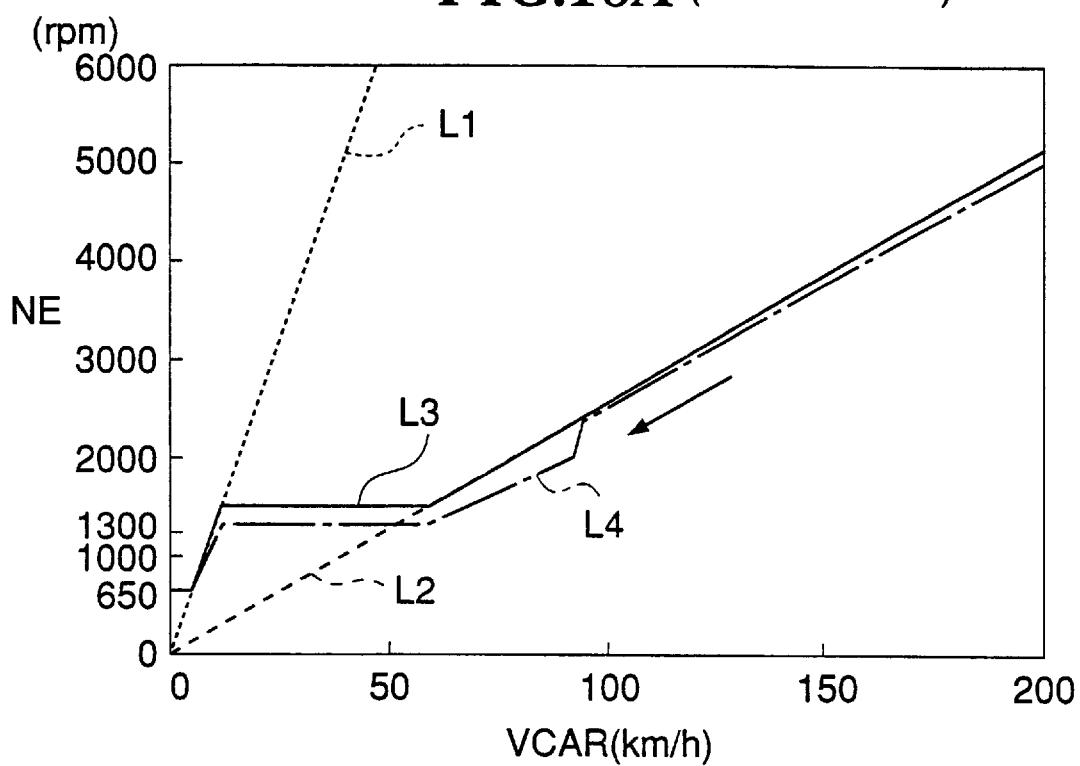
FIG. 18A is a graph showing the relationship between the vehicle speed VCAR and the engine rotational speed NE during a quick deceleration braking operation, obtained by the prior art.
Figure 18B:
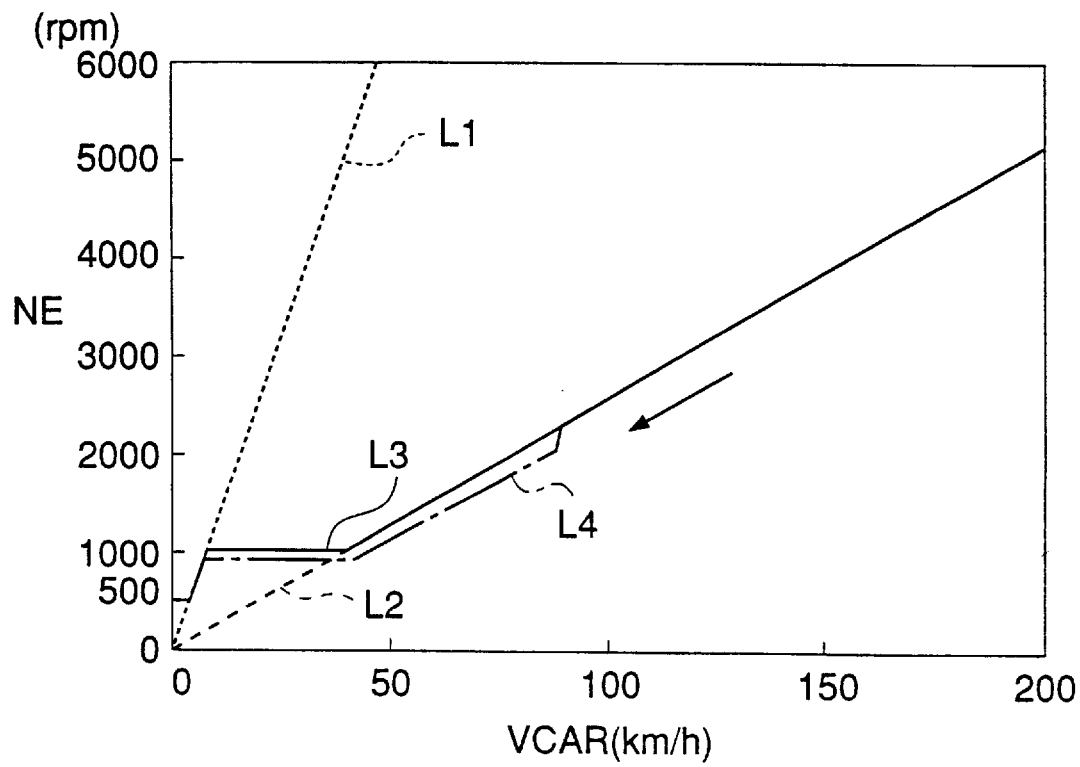
FIG. 18B is a similar graph to FIG. 18A, according to the present invention.

FIG. 18A shows the relationship between the vehicle speed VCAR and the engine rotational speed NE, obtained by a vehicle having no traction motor (hereinafter referred to as "the prior art"), and FIG. 18B the relationship obtained by the present embodiment.

In the figures, a broken line L1 represents a VCAR/NE line corresponding to the lowest change gear ratio of a variable speed transmission of the vehicle, and a broken line L2 the highest change gear ratio of the same. The broken line L2 overlaps with a solid line L3 and a dot-dash line L4, and therefore only part of the broken line L2 appears.

The solid line L3 represents a VCAR/NE line indicative of a gear shifting characteristic of the transmission obtained when the vehicle is decelerated from a vehicle speed of 200 km/h to zero, on the premise that there is no slip in the clutch. When the engine rotational speed NE lowers to a predetermined value NECST, the change gear ratio is changed to the lowest gear ratio so as to maintain the value NECST, and after the solid line L3 reaches the broken line L1, the vehicle speed decreases along the broken line L1 until the engine rotational speed NE becomes equal to the idling rotational speed. Then, the engine control is carried out by resuming the fuel supply to the engine and setting the engaging force of the clutch to a smaller value such that the idling rotational speed is maintained. During idling of the engine rotational speed, since the engaging force of the clutch is thus set to the smaller value, pseudo creeping torque (corresponding to creeping torque generated by a torque converter) is generated.

The dot-dash line L4 indicates a gear shifting characteristic of the transmission, obtained when there occurs a slip in the clutch, and the line L4 is shifted toward the lower rotational speed side than the solid line L3. The above predetermined rotational speed value NECST is set to approximately 1300 rpm according to the prior art, which is set based on the torque that can be transmitted by the clutch whose engaging force is controlled during quick deceleration of the vehicle, the response speed of the clutch, etc., so as to avoid engine stalling during quick deceleration of the vehicle. On the other hand, according to the present embodiment, as described hereinabove, the assistance of the traction motor 3 is carried out in response to detection of the quick decelerating brake operation, and therefore the predetermined rotational speed value NECST can be lowered to approximately 900 rpm. As a result, the engine rotational speed NE can be lowered during deceleration of the vehicle, and therefore the loss of energy due to engine braking can be reduced, to thereby improve the efficiency of regeneration.

Further, while the idling rotational speed is set to approximately 650 rpm according to the prior art, it can be lowered to approximately 500 rpm according to the present embodiment since there is no fear of engine stalling. As a result, the time period over which the fuel supply is interrupted can be prolonged, to thereby improve the fuel economy.

FIGS. 19A1, 19B1, 20A1, 20B1, and 20C show changes in clutch torque TCL (torque that can be transmitted by the clutch), input shaft torque TTMS (torque transmitted to the input shaft of the transmission 4), engine output torque TENG (torque output from the engine), the engine rotational speed NE, and motor output torque TMTR (torque output from the traction motor 3), respectively, obtained when the quick deceleration brake operation takes place at a vehicle speed of 40 km/h, according to the present embodiment. Further, FIGS. 19A2, 19B2, 20A2, and 20B2 show changes in the TCL value, the TTMS value, the TENG value and the NE value, respectively, according to the prior art. In the figures, the abscissa depicts the time t, where a time point at which the quick decelerating brake operation takes place is indicated as 0. The engine output torque TENG actually contains fluctuation components corresponding to the time interval of explosion of each cylinder, which, however, are omitted in the figures.

In an area of t<0, as shown in FIGS. 20B1 and 20B2, the engine rotational speed NE is lower in the present embodiment than in the prior art, this is for the reason mentioned above. Therefore, in the present embodiment, the friction of the engine is smaller than in the prior art, and hence the engine output torque TENG (FIG. 20A1) is only about half the engine output torque in the prior art (FIG. 20A2). In this connection, TENG<0 means that the engine is driven by the driving wheels.

Further, the transmission input shaft torque TTMS in the present embodiment is almost triple compared with the torque TTMS in the prior art (see FIGS. 19B1 and 19B2), since the torque regenerated by the traction motor 3 is added thereto. That is, according to the present embodiment, most of kinetic energy generated by deceleration is collected by regeneration by means of the traction motor 3.

Next, in an area of t>0, the clutch torque TCL is not changed over 0.5 seconds after the start of the brake operation in the prior art as well as in the present embodiment (see FIGS. 19A1 and 19A2). This is because of a time lag from the time lowering of the engine rotational speed NE is detected to the time a control signal to the clutch actuator 305 (solenoid for controlling the hydraulic pressure) is changed in response to the detection and then the hydraulic pressure controlled by the signal is actually lowered to change the engaging force of the clutch. It further takes 0.5 seconds from the start of the lowering of the clutch torque TCL until it becomes almost equal to 0.

On the other hand, the transmission input shaft torque TTMS suddenly changes in the torque transmitting direction from a positive direction to a negative direction upon instantaneous stopping of the rotation of the drive shaft (driving wheels) caused by the quick decelerating brake operation. That is, in the area of t<0, the torque is transmitted in the direction of rotating the engine, whereas in the area of t>0, the torque is transmitted in the direction of stopping the engine. In the latter case, the engine rotational speed NE is suddenly lowered, and in response to the sudden lowering of the engine rotational speed NE, fuel supply to the engine is resumed. Then, if the engine rotational speed NE further lowers below a predetermined value, the throttle valve is controlled to open, and hence the engine output torque is increased to prevent engine stalling.

In the prior art, in consideration of a delay in the resumption of fuel supply and a delay in the control of increasing of the amount of intake air for coping with the lowering of the engine rotational speed NE caused by the quick decelerating brake operation, the predetermined value NECST at which the gear change ratio is changed is set, e.g. to approximately 1300 rpm.

On the other hand, according to the present embodiment, when the quick decelerating brake operation is detected, the operating mode of the traction motor 3 which is quick in response is switched from the regeneration mode to the assisting (driving) mode (FIG. 20C), to thereby prevent engine stalling. At this time, the initial value of the motor torque TMTR (e.g. approximately 3 kgm in FIG. 20C) is set to a value obtained by adding the friction torque of the engine to the regenerative torque assumed immediately before the quick brake operation. Thereafter, the motor torque TMTR is controlled so that the vehicle can smoothly shift to the idling condition. Thus, according to the present embodiment, when the quick deceleration brake operation takes place, the assistance of the traction motor 3 is carried out, and therefore the predetermined rotational speed value NECST can be lowered far below that of the prior art. As a result, the loss of energy due to the friction of the engine can be decreased, to thereby improve the efficiency of regeneration. Further, since the time period over which the fuel supply is interrupted can be prolonged, the fuel economy can be improved.

The invention is not limited to the embodiment described above, but it may be implemented by various modifications and variations thereof. For example, as the electrical energy-storing means, a capacitor having a large electrostatic capacity may be used in combination with or in place of the storage battery 14.

Further, the invention may be applied to an engine which uses, in place of the throttle valve 103 of the so-called DBW type, a throttle valve of an ordinary type which is mechanically linked to the accelerator pedal.

Still further, although in the present embodiment, if FCH=0 holds, i.e. if recharging of the storage battery is not permitted, or if the temperature TD of the protective resistance of the PDU 13 is higher than the predetermined value TDF, the regeneration of electrical energy is inhibited (amount of regeneration=0) (steps S61, S52, S63 and S71 in FIG. 12), this is not limitative. Alternatively, the amount of regeneration may be set to a very small value.

Even further, the transmission 4 may be replaced by an automatic transmission which is capable of changing the change gear ratio in a stepwise manner. In such a case, a lock-up clutch of the torque converter corresponds to the clutch 5 in the present embodiment, and it is arranged at a location between the traction motor 3 and the transmission 4, which, however, does not form an essential difference between the present embodiment and the modified case. Even when a variable speed transmission is employed as in the above described embodiment, the clutch 5 may be arranged at the same location as the lock-up clutch.

What is claimed is:

1. A control system for a hybrid vehicle including driving wheels, an internal combustion engine, a drive shaft driven by said engine, a traction motor having an assisting function of driving said drive shaft by electrical energy and a regenerative function of converting kinetic energy of said drive shaft into electrical energy, a transmission arranged between (i) said driving wheels of said vehicle and (ii) said engine and said traction motor, a clutch arranged between said (i) driving wheels of said vehicle and (ii) said engine and said traction motor, and electrical storage means for supplying electrical energy to said traction motor and for storing electrical energy output from said traction motor, the control system comprising:

vehicle quick deceleration-detecting means for detecting quick deceleration of said vehicle based on operating conditions of said vehicle, and traction motor control means for carrying out said assisting function by controlling a motor output torque from said traction motor to a predetermined positive value upon detection of said quick deceleration of said vehicle by said vehicle quick deceleration-detecting means, wherein said predetermined positive value of said motor output torque from said traction motor is based on a characteristic of control of an engaging force of said clutch carried out when said quick deceleration of said vehicle is detected.

2. A control system as claimed in claim 1, wherein said traction motor control means sets said predetermined positive value to be constant until said engaging force of said clutch assumes a value smaller than a value for normal traveling of said vehicle.

3. A control system as claimed in claim 2, wherein said traction motor control means progressively decreases said predetermined positive value after said engaging force of said clutch assumes said value smaller than said value for normal traveling of said vehicle.

4. A control system for a hybrid vehicle including driving wheels, an internal combustion engine, a drive shaft driven by said engine, a traction motor having an assisting function of driving said drive shaft by electrical energy and a regenerative function of converting kinetic energy of said drive shaft into electrical energy, a transmission arranged between (i) said driving wheels of said vehicle and (ii) said engine and said traction motor, a clutch arranged between (i) said driving wheels of said vehicle and (ii) said engine and said traction motor, and electrical storage means for supplying electrical energy to said traction motor and for storing electrical energy output from said traction motor, the control system comprising:

vehicle quick deceleration-detecting means for detecting quick deceleration of said vehicle based on operating conditions of said vehicle, and traction motor control means for carrying out said assisting function by controlling a motor output torque from said traction motor to a predetermined positive value upon detection of said quick deceleration of said vehicle by said vehicle quick deceleration-detecting means, wherein said vehicle quick deceleration-detecting means includes vehicle speed-detecting means for detecting a traveling speed of said vehicle, and vehicle speed change amount-calculating means for calculating an amount of change in said traveling speed of said vehicle, said vehicle quick deceleration-detecting means detecting said quick deceleration based on the detected traveling speed and the detected amount of change in said traveling speed, and wherein said vehicle quick deceleration-detecting means determines that said vehicle has been quickly decelerated only when: (i) said traveling speed detected by said vehicle speed-detecting means is almost equal to 0, and (ii) said amount of change in said traveling speed detected by said vehicle speed change amount-detecting means is larger than a predetermined value.

5. A control system for a hybrid vehicle including driving wheels, an internal combustion engine, a drive shaft driven by said engine, a traction motor having an assisting function of driving said drive shaft by electrical energy and a regenerative function of converting kinetic energy of said drive shaft into electrical energy, a transmission arranged between (i) said driving wheels of said vehicle and (ii) said engine and said traction motor, a clutch arranged between (i) said driving wheels of said vehicle and (ii) said engine and said traction motor, and electrical storage means for supplying electrical energy to said traction motor and for storing electrical energy output from said traction motor, the control system comprising:

vehicle quick deceleration-detecting means for detecting quick deceleration of said vehicle based on operating conditions of said vehicle, and traction motor control means for carrying out said assisting function by controlling a motor output torque from said traction motor to a predetermined positive value upon detection of said quick deceleration of said vehicle by said vehicle quick deceleration-detecting means, wherein said vehicle quick deceleration-detecting means includes vehicle speed-detecting means for detecting a traveling speed of said vehicle, and vehicle speed change amount-calculating means for calculating an amount of change in said traveling speed of said vehicle, said vehicle quick deceleration-detecting means detecting said quick deceleration based on the detected traveling speed and the detected amount of change in said traveling speed, and wherein said vehicle includes a brake pedal and said vehicle quick deceleration-detecting means includes stepping on operation-detecting means for detecting a stepping on operation of said brake pedal, and wherein said vehicle quick deceleration-detecting means determines that said vehicle has been quickly decelerated only when: (i) said traveling speed detected by said vehicle speed detecting means is almost equal to 0, (ii) said amount of change in said traveling speed detected by said vehicle speed change amount-detecting means is larger than a predetermined value, and (iii) said stepping-on operation of said brake pedal is detected by said stepping-on operation-detecting means.

* * * * *